United States Patent
Kishikawa et al.

(10) Patent No.: US 10,197,710 B2
(45) Date of Patent: Feb. 5, 2019

(54) ANTIFOGGING ARTICLE AND METHOD FOR MANUFACTURING THE SAME, WATER ABSORBING LAYER FORMING COMPOSITION, AND ARTICLE FOR TRANSPORTATION APPARATUS

(71) Applicant: ASAHI GLASS COMPANY, LIMITED, Chiyoda-ku (JP)

(72) Inventors: Noriko Kishikawa, Tokyo (JP); Yusuke Mori, Tokyo (JP); Takashige Yoneda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 951 days.

(21) Appl. No.: 14/305,388

(22) Filed: Jun. 16, 2014

(65) Prior Publication Data

US 2014/0295175 A1 Oct. 2, 2014

Related U.S. Application Data

(63) Continuation of application No. PCT/JP2012/082281, filed on Dec. 13, 2012.

(30) Foreign Application Priority Data

Dec. 15, 2011 (JP) .................................. 2011-274096

(51) Int. Cl.
| | |
|---|---|
| *B32B 27/38* | (2006.01) |
| *G02B 1/18* | (2015.01) |
| *C09D 163/00* | (2006.01) |
| *G02B 27/00* | (2006.01) |
| *B32B 27/20* | (2006.01) |
| *C09D 5/16* | (2006.01) |
| *C03C 17/34* | (2006.01) |
| *C09D 5/00* | (2006.01) |

(52) U.S. Cl.
CPC ............... *G02B 1/18* (2015.01); *B32B 27/20* (2013.01); *B32B 27/38* (2013.01); *C03C 17/3405* (2013.01); *C09D 5/00* (2013.01); *C09D 5/1662* (2013.01); *C09D 163/00* (2013.01); *G02B 27/0006* (2013.01); *B32B 2264/102* (2013.01); *B32B 2307/728* (2013.01); *C03C 2217/445* (2013.01); *C03C 2217/476* (2013.01); *C03C 2217/478* (2013.01); *C03C 2217/75* (2013.01); *Y10T 428/264* (2015.01); *Y10T 428/265* (2015.01); *Y10T 428/31515* (2015.04); *Y10T 428/31525* (2015.04)

(58) Field of Classification Search
None
See application file for complete search history.

(56) References Cited

U.S. PATENT DOCUMENTS

| | | | |
|---|---|---|---|
| 4,846,868 A | * | 7/1989 | Aratani ................. C03C 21/002 65/116 |
| 2009/0011244 A1 | | 1/2009 | Kishikawa et al. |
| 2010/0068486 A1 | | 3/2010 | Kayanoki |
| 2012/0171476 A1 | | 7/2012 | Kishikawa et al. |
| 2013/0260145 A1 | | 10/2013 | Kishikawa et al. |
| 2016/0297972 A1 | * | 10/2016 | Mori ....................... C03C 17/34 |

FOREIGN PATENT DOCUMENTS

| | | |
|---|---|---|
| EP | 1 944 277 | 7/2008 |
| EP | 2 123 448 | 11/2009 |
| JP | 2008-273067 | 11/2008 |
| WO | 2007/052710 | 5/2007 |
| WO | 2008/111564 | 9/2008 |
| WO | 2009/151086 | 12/2009 |
| WO | 2011/004873 | 1/2011 |

OTHER PUBLICATIONS

Functional Fillers for Plastics, Second, Updated and Enlarge Edition, Wiley-VCH. 2010, p. 84.*
Kishikawa et al., Machine Translation of WO2009151086A1. Dec. 7, 2009.*
International Preliminary Report on Patentability and Written Opinion dated Jun. 26, 2014 in PCT/JP2012/082281 (submitting English language translation only).
International Search Report dated Jan. 15, 2013 in PCT/JP2012/082281 filed Dec. 13, 2012.
U.S. Appl. No. 14/305,388, filed Jun. 16, 2014, Kishikawa et al.
U.S. Appl. No. 13/904,550, filed May 29, 2013, Kishikawa et al.

* cited by examiner

*Primary Examiner* — Coris Fung
(74) *Attorney, Agent, or Firm* — Oblon, McClelland, Maier & Neustadt, L.L.P.

(57) ABSTRACT

There are provided an antifogging article having a water absorbing layer which excels in antifogging property, in durability and appearance, a method for manufacturing the same, an article for transportation apparatus having the antifogging article, and a water absorbing layer forming composition. The antifogging article has a substrate and an antifogging film on a surface of the substrate, in which the antifogging film has a water absorbing layer constituted of a water absorbing material with a saturated water absorption amount of 50 mg/cm$^3$ or more, the water absorbing material is containing a first cured epoxy resin obtained by reacting the composition containing a polyepoxide component, a polyaddition type curing agent, and a catalyst type curing agent, and the polyepoxide component is constituted only of at least two polyepoxides selected from aliphatic polyepoxides with molecular weights of 800 to 3000. The article for transportation apparatus has the antifogging article.

15 Claims, No Drawings

ANTIFOGGING ARTICLE AND METHOD FOR MANUFACTURING THE SAME, WATER ABSORBING LAYER FORMING COMPOSITION, AND ARTICLE FOR TRANSPORTATION APPARATUS

CROSS-REFERENCE TO RELATED APPLICATIONS

This application is a continuation of prior International Application No. PCT/JP2012/082281, filed on Dec. 13, 2012 which is based upon and claims the benefit of priority from Japanese Patent Application No. 2011-274096, filed on Dec. 15, 2011; the entire contents of all of which are incorporated herein by reference.

FIELD

The present invention relates to an antifogging article and a method for manufacturing the same, a water absorbing layer forming composition used for manufacturing the antifogging article, and an article for transportation apparatus which has the antifogging article.

BACKGROUND

Regarding a transparent substrate such as glass or plastic, when a substrate surface is at a temperature of dew-point or lower, minute water droplets adhere to the surface and scatter transmitted light, which impairs transparency, resulting in what is called "fogging". As means for preventing fogging, various proposals have been made hitherto.

Specifically, there are known (1) method to lower the surface tension of adhering water droplets by treating the substrate surface with a surfactant, (2) method to make the substrate surface hydrophilic by adding a hydrophilic property to the substrate surface by using a hydrophilic resin or a hydrophilic inorganic chemical compound, (3) method to maintain the substrate surface to a temperature of dew-point or more by installing a heater or the like on the substrate and heating by it, (4) method to provide a water absorbing resin layer on the substrate surface and remove the minute water droplets formed on the substrate surface by absorption, and/or reduce atmospheric humidity on the substrate surface, and the like.

However, by the above method (1) or (2), a water film is formed on the formed film surface and a change occurs easily in appearance due to occurrence of distortion, forming water droplets, and/or the like when it is retained for a long period in a high-humidity environment, and also a sticky feeling when used may be felt somewhat unpleasant. Further, in the method of (3), the antifogging performance can be sustained semipermanently, but the energy accompanying supplying electricity is constantly needed, and thus it is very costly. On the other hand, the method of (4) is regarded as a particularly excellent method as means for preventing fogging because excellent antifogging property can be exhibited without requiring running costs, in addition to that it causes no change in appearance and its sense of use is often appreciated due to that no water exists on the surface.

As such antifogging technology of (4) utilizing a water absorbing compound layer, specifically, an antifogging article having an antifogging film in which a low water absorbing cross-linking resin layer and a high water absorbing cross-linking resin layer are layered sequentially on a substrate surface has been proposed (see Patent Reference 1 (JP-A 2008-273067)). The antifogging film described in Patent Reference 1 is an antifogging film having both antifogging property and durability. However, it has a problem of impairing appearance when it is attempted to further increase the durability for use in applications requiring high durability. Accordingly, an antifogging article having an antifogging film which excels in antifogging property and having both durability, such as abrasion resistance and peeling resistance, and good appearance has been demanded.

SUMMARY OF THE INVENTION

Here, in Patent Reference 1, in order to increase durability of the antifogging film, a cross-linking resin with a relatively high molecular weight is used to form the high water absorbing cross-linking resin layer. Because of this, its appearance is impaired and for solving this, it is conceivable to form the high water absorbing cross-linking resin layer by combining a cross-linking component with a low molecular weight and a cross-linking component with a high molecular weight. However, there is a concern that a component that is not taken into the cross-linking structure from the cross-linking component with a low molecular weight bleeds out under a high-humidity condition or the like after film formation and thereby decreasing moisture resistance, and for preventing this, it is conceivable to add a step of performing a hot water treatment on an antifogging film after cross-linking curing. Adding a step leads to decrease in production efficiency, and thus there has been demanded an antifogging article having an antifogging film which excels in antifogging property and having both durability, such as abrasion resistance and moisture resistance, and good appearance, which can be obtained without adding a step.

It is an object of the present invention to provide an antifogging article having a water absorbing layer which excels in antifogging property and also excels in durability, such as abrasion resistance and moisture resistance, and appearance, and a method for manufacturing the same, and an article for transportation apparatus having the antifogging article.

It is also an object of the present invention to provide a water absorbing layer forming composition for obtaining the antifogging article having a water absorbing layer which excels in antifogging property and also excels in durability, such as abrasion resistance and moisture resistance, and appearance.

The present invention provides an antifogging article and a method for manufacturing the same, a water absorbing layer forming composition, and an article for transportation apparatus which have a structure as follows.

[1] An antifogging article having a substrate and an antifogging film on a surface of at least a part of the substrate, wherein: the antifogging film has a water absorbing layer formed on the substrate surface and constituted of a water absorbing material with a saturated water absorption amount of 50 mg/cm$^3$ or more; the water absorbing material is a material containing a first cured epoxy resin as a main body obtained by reacting a water absorbing layer forming composition containing a polyepoxide component, a polyaddition type curing agent, and a catalyst type curing agent; and the polyepoxide component contained in the water absorbing layer forming composition is constituted only of at least two kinds of polyepoxides selected from aliphatic polyepoxides with molecular weights of 800 to 3000.

[2] The antifogging article according to [1], wherein the water absorbing layer forming composition further contains a filler.

[3] The antifogging article according to [2], wherein a content of the filler is 0.5 to 30 mass % relative to 100 mass % of the total mass of the polyepoxide component, the polyaddition type curing agent, and the catalyst type curing agent.

[4] The antifogging article according to [2], wherein the filler is silica particles.

[5] The antifogging article according to [1], wherein the polyaddition type curing agent contains a polyamine compound having active hydrogen.

[6] The antifogging article according to [5], wherein an equivalent ratio of amine active hydrogen relative to epoxy groups included in an entire solid amount contained in the water absorbing layer forming composition is 0.6 to 0.8.

[7] The antifogging article according to [1], wherein a content of the catalyst type curing agent is 1.0 to 20 mass % relative to 100 mass % of the polyepoxide component.

[8] The antifogging article according to [1], wherein the catalyst type curing agent contains an imidazole compound.

[9] The antifogging article according to [1], wherein the water absorbing layer forming composition further contains a silane coupling agent.

[10] The antifogging article according to [9], wherein a content of the silane coupling agent is 5 to 40 mass % relative to 100 mass % of the total mass of the polyepoxide component, the polyaddition type curing agent, and the catalyst type curing agent.

[11] The antifogging article according to [1], wherein a film thickness of the water absorbing layer is 5 to 40 μm.

[12] The antifogging article according to [1], wherein the antifogging film further has a base layer constituted of a base material with a saturated water absorption amount of 10 mg/cm$^3$ or less between the substrate and the water absorbing layer.

[13] The antifogging article according to [12], wherein the base material is a material whose main body is a second cured epoxy resin obtained by reacting a base layer forming composition containing a polyepoxide component and a polyaddition type curing agent.

[14] The antifogging article according to [12], wherein a film thickness of the base layer is 2 to 8 μm.

[15] The antifogging article according to [1], wherein the substrate is constituted of a soda lime glass.

[16] An article for transportation apparatus, including the antifogging article according to [1].

[17] A method for manufacturing the antifogging article according to [12], the method including: applying and reacting the base layer forming composition on a substrate surface, so as to form a base layer constituted of the base material; and applying and reacting on a surface of the base layer the water absorbing layer forming composition, so as to form a water absorbing layer constituted of the water absorbing material.

[18] A water absorbing layer forming composition for obtaining the antifogging article according to [1], the water absorbing layer forming composition containing a polyepoxide component, a polyaddition type curing agent, a catalyst type curing agent, and a solvent, wherein the polyepoxide component contained in the water absorbing layer forming composition is constituted only of at least two kinds of polyepoxides selected from aliphatic polyepoxides with molecular weights of 800 to 3000.

According to the present invention, it is possible to provide an antifogging article having a water absorbing layer which excels in antifogging property and also excels in durability, such as abrasion resistance and moisture resistance, and appearance and a method for manufacturing the same, and an article for transportation apparatus having the antifogging article.

The antifogging article having the water absorbing layer formed of the water absorbing layer forming composition of the present invention excels in antifogging property and also excels in durability, such as abrasion resistance and moisture resistance, and appearance.

DETAILED DESCRIPTION

Hereinafter, embodiments of the present invention will be described. Note that the present invention should not be construed as limited to the following description.

<Antifogging Article>

An antifogging article of the present invention is an antifogging article having a substrate and an antifogging film on a surface of at least a part of the substrate, in which the antifogging film has a water absorbing layer formed on the substrate surface and constituted of a water absorbing material with a saturated water absorption amount of 50 mg/cm$^3$ or more, the water absorbing material is a material containing a first cured epoxy resin as a main body obtained by reacting a water absorbing layer forming composition containing a polyepoxide component, a polyaddition type curing agent, and a catalyst type curing agent, and the polyepoxide component contained in the water absorbing layer forming composition is constituted only of at least two kinds of polyepoxides selected from aliphatic polyepoxides with molecular weights of 800 to 3000.

In the antifogging article of the present invention, an antifogging property is exhibited by an antifogging film on a substrate, particularly a water absorbing layer which the antifogging film has. In the present invention, by constituting the water absorbing layer with the first cured epoxy resin as a main body obtained by cross-link reacting the polyepoxide component, constituted only of at least two kinds selected from the aliphatic polyepoxides with high molecular weights, together with the polyaddition type curing agent and the catalyst type curing agent, it is possible to make the product excel in antifogging property and have durability, such as abrasion resistance and moisture resistance, and meanwhile have a good appearance, without causing occurrence of problems such as bleedout of a low molecular weight component.

Further, preferably, the antifogging film in the antifogging article of the present invention further has a base layer constituted of a base material with a saturated water absorption amount of 10 mg/cm$^3$ or less between the substrate and the water absorbing layer. By constituting the antifogging film by combining two layers whose water absorbing properties are in the relation of water absorbing layer >base layer, an antifogging article further exceling in peeling resistance can be obtained while maintaining the above characteristics as described in above-described Patent Reference 1.

Specifically, a water absorbing layer with a high water absorbing property tends to decrease in adhesiveness of an adhesive interface due to factors such as accumulation of interface stress in an adhesive interface by repetition of large expansion and contraction accompanying the high water absorbing property, arrival of various types of ion components taken together with water into the adhesive interface, and moreover eluting ion components from the substrate to the interface by the influence of water reaching the adhesive interface. Accordingly, when the base layer having a lower water absorbing property than the water absorbing layer is provided between the substrate and the water absorbing layer, the adhesiveness with the substrate interface is improved because the interface stress accumulated in the adhesive interface with the substrate is alleviated owing to that the base layer has a small degree of expansion and contraction due to the low water absorbing property, and it has an operation to suppress moisture and ion components from reaching the adhesive interface with the substrate, therefore the peeling resistance improves, making it possible to exhibit more excellent durability.

Hereinafter, elements constituting the antifogging article will be described.

[1] Substrate

The substrate used for the antifogging article of the present invention is not particularly limited as long as it is a substrate constituted of a material for which addition of an antifogging property is generally desired. Preferably, a substrate constituted of glass, plastic, metal, ceramics, or a combination of these (composite material, layered material, or the like) is exemplified, or more preferably a transparent substrate constituted of glass or plastic, and a mirror or the like are exemplified. As the glass, an ordinary soda lime glass, borosilicate glass, non-alkali glass, quartz glass, or the like is exemplified, and among them, the soda lime glass is particularly preferred. Further, as the plastic, acryl-based resin such as polymethyl methacrylate, aromatic polycarbonate-based resin such as polyphenylene carbonate, and aromatic polyester based resin such as polyethylene terephthalate (PET) are exemplified, and among them, the polyethylene terephthalate (PET), polyphenylene carbonate, or the like is particularly preferred.

Among the above various substrates, in the present invention, a substrate constituted of the soda lime glass is particularly preferred.

The shape of the substrate may be a flat plate, or the entire surface or a part thereof may have a curvature. The thickness of the substrate can be selected appropriately depending on the application of the antifogging article, preferably 1 to 10 mm in general.

Further, the substrate preferably has a reactive group on its surface. As the reactive group, a hydrophilic group is preferred, and as the hydrophilic group, a hydroxyl group is preferred. Further, an oxygen plasma treatment, a corona discharge treatment, an ozone treatment, or the like may be performed on the substrate to decompose and remove organic matters adhering to the surface, or form a minute convexoconcave structure on the surface to thereby make the substrate surface hydrophilic. Note that the glass or metal oxide normally has a hydroxyl group on its surface.

Further, for the purpose of increasing adhesiveness to a base layer formed on its surface in the antifogging article of the present invention, the substrate may be one in which a metal oxide thin film of silica, alumina, titania, zirconia, or the like or a thin film constituted of metal oxide containing an organic group is provided on the surface of the substrate of glass or the like.

The metal oxide thin film can be formed using a metal chemical compound having a hydrolyzable group such as a publicly known method such as sol-gel method.

As the metal compound, preferred one is tetraalkoxysilane, tetraisocyanatesilane, or oligomer thereof (that is, partially hydrolyzed condensate thereof) or the like.

The thin film constituted of metal oxide containing an organic group can be obtained by treating the substrate surface with an organic metal-based coupling agent. As the organic metal-based coupling agent, it is possible to use a silane-based coupling agent, titanium-based coupling agent, aluminum-based coupling agent, or the like, and preferably the silane-based coupling agent is used. Hereinafter, the coupling agent for treating the substrate surface in advance will be referred to as a "coupling agent for surface treatment".

[2] Antifogging Film

In the antifogging article of the present invention, the antifogging film formed on the surface of at least a part of the substrate has a water absorbing layer formed on the substrate. The antifogging film has a structure which is, preferably, layered in the order of a base layer and a water absorbing layer from the substrate side.

[2-1] Water Absorbing Layer

The water absorbing layer included in the antifogging film is constituted of a water absorbing material with a saturated water absorption amount of 50 mg/cm$^3$ or more, and the water absorbing material is a material containing a first cured epoxy resin as a main body obtained by reacting a water absorbing layer forming composition containing a polyepoxide component, a polyaddition type curing agent, and a catalyst type curing agent, the polyepoxide component being constituted only of at least two kinds of polyepoxides selected from aliphatic polyepoxides with a molecular weight of 800 to 3000.

The water absorbing layer in the antifogging article of the present invention has a sufficient water absorbing property for exhibiting an adequate antifogging property when made as an antifogging film. Further, its water absorbing property is high compared to the water absorbing property of the base layer when the base layer is present between the substrate and the water absorbing layer. Here, the water absorbing properties of the water absorbing material constituting the water absorbing layer and the base material constituting the base layer are relative to each other, and hereinafter, as necessary, the water absorbing material constituting the water absorbing layer will be referred to as a high water absorbing material, and the base material constituting the base layer will be referred to as a low water absorbing material, but the "high water absorbing property" and the "low water absorbing property" in the water absorbing properties of both the materials do not meant to be high or low by threshold.

The water absorbing property of the water absorbing material constituting the water absorbing layer can be indicated specifically by a saturated water absorption amount measured by the following method. The saturated water absorption amount of the water absorbing material constituting the water absorbing layer is 50 mg/cm$^3$ or more, preferably 70 mg/cm$^3$ or more, more preferably 100 mg/cm$^3$ or more. When the saturated water absorption amount of the water absorbing material constituting the water absorbing layer takes the above values, a sufficient antifogging property can be ensured. On the other hand, from a viewpoint of preventing low durability of the antifogging film, the saturated water absorption amount of the water absorbing material constituting the water absorbing layer is preferably 900 mg/cm$^3$ or less, more preferably 500 mg/cm$^3$ or less.

(Method of Measuring the Saturated Water Absorption Amount)

A layer of material to be an analyte (hereinafter referred to as a "material layer") is provided on a soda lime glass substrate of 3 cm×4 cm×2 mm thickness, which is left for two hours in a thermohygrostat bath under an environment of 10° C., 95 to 99% RH, and after it is taken out, the amount of moisture (I) of the entire substrate with the material layer is measured by using a micro moisture meter. Moreover, the amount of water (II) is measured through the same procedure from only the substrate. A value obtained by dividing a value resulted from subtracting the amount of water (II) from the amount of water (I), by the volume of the material layer is taken as the saturated water absorption amount. Note that the measurement of water amount is performed as follows by a micro moisture meter FM-300 (trade name, made by Kett Electric Laboratory). The measurement sample is heated for 120° C., moisture emitted from the sample is let absorbed by molecular sieves in the micro moisture meter, and a change in mass of the molecular sieves is measured as the amount of water. Further, the end point of measurement is a point where the change in mass per 25 seconds becomes less than or equal to 0.05 mg.

Note that although the saturated water absorption amount is an index indicating the water absorbing property of the water absorbing material constituting the water absorbing layer, the "water absorbing and antifogging property" defined below will be used as necessary in the present description as an index indicating the water absorbing property of the water absorbing layer itself owing to the water absorbing material constituting the water absorbing layer and the thickness of the layer.

The water absorbing and antifogging property is indicated by an antifogging time (seconds) until a fog is recognized by visual observation when the surface of the material layer is held above a hot water bath of 40° C. after the substrate with the material layer prepared in the same way as above is left for one hour under an environment of 20° C. and 50% RH.

When the water absorbing and antifogging property is presented as an index for the water absorbing property of the water absorbing layer provided on the antifogging article of the present invention, the water absorbing and antifogging property can be 50 seconds or more, 60 seconds or more in a further preferred embodiment, or 70 seconds or more in a particularly preferred embodiment.

From the relation between the saturated water absorption amount of the water absorbing material constituting the water absorbing layer and the water absorbing and antifogging property of the water absorbing layer, the film thickness of the water absorbing layer related to the antifogging article of the present invention is preferably 5 μm or more, more preferably 10 μm or more. Thus, the saturated water absorption amount needed as the entire antifogging film can be ensured easily. On the other hand, from the viewpoint of preventing low durability of the antifogging film, the film thickness of the water absorbing layer is preferably 40 μm or less, more preferably 30 μm or less.

Here, the antifogging performance required for the antifogging article differs depending on the application, and thus the design of the water absorbing layer may be changed appropriately in line with demanded performance.

The water absorbing material constituting the water absorbing layer is constituted of a first cured epoxy resin, as a main body, obtained by reacting a water absorbing layer forming composition containing a polyepoxide component constituted only of at least two kinds selected from aliphatic polyepoxides with molecular weights of 800 to 3000, a polyaddition type curing agent, and a catalyst type curing agent. That is, the high water absorbing property of the water absorbing layer mentioned above is a performance obtained mainly by designing the first cured epoxy resin to have a high water absorbing property.

The "polyepoxide" in this description refers to a chemical compound having two or more epoxy groups. The polyepoxide includes a low molecular chemical compound, oligomer, and polymer. The "polyepoxide component" is a component constituted only of polyepoxide and is constituted of at least one or more kinds of polyepoxides, which will be referred also to as a main agent as necessary below.

Further, among the curing agents, the "polyaddition type curing agent" is a chemical compound having two or more reactive groups which react with the epoxy groups contained in the polyepoxide, and refers to a curing agent of the type that undergoes polyaddition with a polyepoxide by reaction. The "catalyst type curing agent" is a catalyst such as Lewis acid, and refers to a curing agent that catalyzes a polymerization reaction of polyepoxides with each other and/or a polyaddition reaction between a polyepoxide and a polyaddition type curing agent. Note that while there are a thermosetting type and a light-curing type among catalyst type curing agents, they are both treated as a catalyst type curing agent.

Moreover, the "cured epoxy resin" refers to a cured product having a structure obtained by reaction of the main agent and the polyaddition type curing agent in which the polyepoxides are cross-linked by the polyaddition type curing agent and becomes three dimensional, and/or a structure in which the polyepoxides linearly or three-dimensionally polymerize with each other due to operation of the catalyst type curing agent.

Here, the water absorbing property of the cured epoxy resin depends on the existing amounts of hydrophilic group such as a hydroxyl group and hydrophilic chain (polyoxyethylene group or the like) mainly derived from the main agent. The water absorbing property also depends on the degree of cross linking in the cured epoxy resin. When the number of cross-linking points contained in the cured epoxy resin per certain unit amount is large, the cured epoxy resin becomes a dense three-dimensional network structure, and thus it is conceivable that the water absorbing property becomes low because spaces for water retention become small. Further, in general, it is said that durability of cured epoxy resin improves when the number of cross-linking points is large. On the other hand, when the number of cross-linking points contained per unit amount is small, spaces for water retention become large, and it is conceivable that the water absorbing property becomes high but the durability decreases.

The glass transition point of the cured epoxy resin is deeply related with the number of cross-linking points in the cured epoxy resin, and in general it is conceivable that a resin with a high glass transition point has a large number of cross-linking points contained per certain unit amount. Therefore, in general, preferably, to increase the antifogging performance the glass transition point of the cured epoxy resin is controlled to be low, or to increase durability the glass transition point of the cured epoxy resin is controlled to be high. Considering these, the glass transition point of the first cured epoxy resin having a high water absorbing property which mainly forms the water absorbing layer is, although depending on the type of the cured epoxy resin, preferably −20 to 60° C., more preferably −5 to 40° C.

Note that the glass transition point is a value measured in conformity to JIS K 7121. Specifically, it is a value measured by using a differential scanning calorimeter after providing a resin layer to be an analyte on the substrate and leaving it for one hour under an environment of 20° C. and 50% RH. However, the heating rate during measurement is 10° C./minute.

The first cured epoxy resin mainly constituting the water absorbing layer will be described below. The first cured epoxy resin is obtained by reacting a water absorbing layer forming composition containing a polyepoxide component constituted only of at least two kinds selected from aliphatic polyepoxides with molecular weights of 800 to 3000, a polyaddition type curing agent, and a catalyst type curing agent. That is, the water absorbing layer forming composition includes no polyepoxide other than the at least two kinds of polyepoxides selected from aliphatic polyepoxides with molecular weights of 800 to 3000 as the polyepoxide component. Note that in the following description, the polyepoxide component for obtaining the first cured epoxy resin will be referred to as a first polyepoxide component, the polyaddition type curing agent will be referred to as a first polyaddition type curing agent, and the catalyst type curing agent will be referred to as a first catalyst type curing agent.

(First Polyepoxide Component)

The first polyepoxide component is constituted only of at least two kinds selected from aliphatic polyepoxides with molecular weights of 800 to 3000.

When the polyepoxide constituting the first polyepoxide component is an aliphatic polyepoxide with a high molecular weight of 800 to 3000, high water absorbing property and durability, such as abrasion resistance and moisture resistance, are added to the obtained cured epoxy resin. A cured epoxy resin obtained by using a polyepoxide having a ring structure, particularly an aromatic polyepoxide, for example a glycidyl ether-based polyepoxide derived from polyphenols, cannot obtain a sufficient water absorbing property for constituting the water absorbing layer. This can be considered as a phenomenon that moisture cannot easily be taken into the three-dimensional network structure due to that the aromatic ring or the like is hard. On the other hand, when the aliphatic polyepoxide with a high molecular weight is used, the three-dimensional network structure possessed by the obtained cured epoxy resin has a space of moderate size and flexibility, and thus it is conceivable that both the high water absorbing property and durability can be obtained.

The first polyepoxide component is constituted only of at least two kinds selected from such aliphatic polyepoxides with high molecular weights of 800 to 3000.

By using two or more kinds of aliphatic polyepoxides with high molecular weights, it is possible to maintain good appearance of the first cured epoxy resin. When at least two kinds of aliphatic high-molecular weight polyepoxides are used in combination, insufficiency of wetting and spreading of applied liquid during solution coating, unevenness of coating film, or the like does not occur in the water absorbing layer forming composition containing them, and a good appearance can be ensured in the obtained water absorbing layer. Moreover, the first polyepoxide component is constituted only of aliphatic polyepoxides with high molecular weights and contains no polyepoxide with a low molecular weight, and thus there occurs no problem due to bleedout of the polyepoxide component.

The at least two kinds of polyepoxides constituting the first polyepoxide component are selected appropriately from aliphatic polyepoxides with molecular weights of 800 to 3000. The combination of at least two kinds of aliphatic polyepoxides may be a combination of aliphatic polyepoxides of the same kinds of chemical compounds and of different molecular weights from each other in the above range, which will be described below, or a combination of aliphatic polyepoxides of different kinds of chemical compounds from each other. In the present invention, a combination of aliphatic polyepoxides having different kinds of chemical compounds is preferred. Note that the aliphatic polyepoxides of the same kinds of chemical compounds and of different molecular weights from each other refer to aliphatic polyepoxides with different molecular weights from each other due to a difference in number of repetitions of chemical compounds having repeated units, such as polyglycerol polyglycidyl ether.

Although the kinds of aliphatic polyepoxides with the above molecular weights constituting the first polyepoxide component are not particularly limited as long as they are two or more kinds, they are preferably 2 to 3 kinds, more preferably two kinds from a viewpoint of workability, application property, and the like. The content ratio of respective aliphatic polyepoxides constituting the first polyepoxide component is preferably a content ratio such that the aliphatic polyepoxides become substantially even. For example, when it is constituted of two kinds of aliphatic polyepoxides, the content ratio of the both is preferably 30:70 to 70:30, more preferably 40:60 to 60:40 as a mass ratio. When the mass ratio of the two or more kinds of aliphatic polyepoxides constituting the first polyepoxide component is in the above ranges, the first cured epoxy resin can have a sufficiently flat appearance.

Note that as the first polyepoxide component, when two or more kinds of aliphatic polyepoxides of the same kinds of chemical compounds but of different molecular weights are used in combination, at least one kind thereof preferably has a molecular weight of 900 to 1500, more preferably 900 to 1450. Further, when two or more kinds of aliphatic polyepoxides of different chemical compounds are combined and used as the first polyepoxide component, they all preferably have a molecular weight of 900 to 1500, more preferably 900 to 1450.

Note that in this description, the molecular weight refers to a mass average molecular weight (Mw) unless otherwise specified. Further, the mass average molecular weight (Mw) in this description refers to a mass average molecular weight measured by gel permeation chromatography (GPC) with polystyrene being a standard.

As the aliphatic polyepoxides with the above molecular weights constituting the first polyepoxide component, aliphatic polyepoxides from polyepoxides used as raw material components of a typical cured epoxy resin, specifically, an aliphatic glycidyl ether-based polyepoxide, an aliphatic glycidyl ester-based polyepoxide, an aliphatic glycidyl amine-based polyepoxide, and/or the like can be used with their molecular weights being adjusted to be in the above ranges. Hereinafter, only the types of chemical compounds will be mentioned, but among these chemical compounds, ones in the above molecular weight ranges are used as the polyepoxides constituting the first polyepoxide component.

Further, although the number of epoxy groups per molecule of the aliphatic polyepoxides in the first polyepoxide component is not particularly limited as long as it is two or more on average, it is preferably 2 to 10, more preferably 3 to 8, furthermore preferably 3 to 7.

Further, an epoxy equivalent of polyepoxide (the number of grams [g/eq] of a resin containing epoxy groups equivalent to one gram, and the unit will be omitted below) indicating the relation between the preferred molecular weights as the aliphatic polyepoxides and an average epoxy group number per this molecule is preferably 140 to 250, more preferably 150 to 220.

The aliphatic glycidyl ether-based polyepoxide is a polyepoxide (or oligomer of this polyepoxide) having a structure in which an alcoholic hydroxyl group of aliphatic polyols having two or more alcoholic hydroxyl groups is substituted by a glycidyloxy group. The aliphatic glycidyl ester-based polyepoxide is a polyepoxide having a structure in which a carboxyl group of aliphatic polycarboxylic acid having two or more carboxyl group is substituted by a glycidyloxy carbonyl group, and the aliphatic glycidyl amine-based polyepoxide is a polyepoxide having a structure in which hydrogen atoms coupled with nitrogen atoms of aliphatic amine having two or more hydrogen atoms coupled with nitrogen atoms are substituted by a glycidyl group.

In the present invention, among them, particularly the aliphatic glycidyl ether-based polyepoxide derived from aliphatic polyols is preferred.

As the raw material aliphatic polyol for the glycidyl ether-based polyepoxide derived from aliphatic polyols, one with the number of hydroxyl groups per molecule being 2 to 10 is preferred, and the more preferred number of hydroxyl groups is the number which is exemplified as a preferred number of epoxy groups in the above polyepoxide.

As the aliphatic polyols, alkane polyols, polyols containing ether oxygen atoms, sugar alcohols, polyoxyalkylene polyols, polyester polyols, and the like are exemplified. As the polyoxyalkylene polyols, chemical compounds obtained by causing ring opening addition polymerization of monoepoxide, such as propylene oxide and ethylene oxide, to a polyol of relatively low molecular weight, such as alkane polyol, polyol containing ether oxygen atoms, and sugar alcohol are exemplified.

As the polyester polyols, chemical compounds having a structure in which an aliphatic diol and an aliphatic dicarboxylic acid are condensed, chemical compounds having a structure in which a cyclic ester is ring-opening polymerized, and the like are exemplified.

As the aliphatic glycidyl ether-based polyepoxide derived from aliphatic polyols used preferably in the present invention, specifically, polyethylene glycol polyglycidyl ether, polyethylene glycol sorbitol polyglycidyl ether, polyoxypropylene diol polyglycidyl ether, polyoxypropylene triol polyglycidyl ether, poly(oxypropylene/oxyethylene)triol polyglycidyl ether, polyglycerol polyglycidyl ether, sorbitol polyglycidyl ether, polysorbitol polyglycidyl ether, and the like are exemplified.

Among these aliphatic polyepoxides, as the first polyepoxide component, a combination of two or more kinds selected from polyglycerol polyglycidyl ether, polyethylene glycol polyglycidyl ether, sorbitol polyglycidyl ether, and polysorbitol polyglycidyl ether with molecular weights of 800 to 3000 is preferred.

As a further preferred combination of two or more kinds of aliphatic polyepoxides constituting the first polyepoxide component, a combination of at least one kind of polyglycerol polyglycidyl ether with a molecular weight of 800 to 3000 and at least one kind selected from polyethylene glycol polyglycidyl ether, sorbitol polyglycidyl ether, and polysorbitol polyglycidyl ether with a molecular weight of 800 to 3000 is exemplified. Among them, a combination of polyglycerol polyglycidyl ether and polysorbitol polyglycidyl ether is particularly preferred.

Note that it is possible to use commercial products for the aliphatic polyepoxides with the above molecular weights constituting the first polyepoxide component. As such commercial products, specifically, Denacol EX-1410 (Mw: 988, epoxy equivalent: 160), Denacol EX-1610 (Mw: 1130, epoxy equivalent: 165), Denacol EX-610U (Mw: 1408, epoxy equivalent: 210) which are aliphatic polyglycidyl ether, Denacol EX-521 (Mw: 1294, epoxy equivalent: 179) which is polyglycerol polyglycidyl ether, and the like are exemplified, all of which are trade names and made by Nagase ChemteX Corporation.

As the sorbitol polyglycidyl ether, Denacol EX-614B (Mw: 949, epoxy equivalent: 171) or the like is exemplified.

(First Polyaddition Type Curing Agent)

The first cured epoxy resin mainly constituting the water absorbing layer is a first cured epoxy resin obtained by reacting the first polyepoxide component and the first polyaddition type curing agent under existence of a first catalyst type curing agent.

The first polyaddition type curing agent is a chemical compound having two or more reactive groups which react with the epoxy groups contained in the polyepoxide and is not particularly limited as long as it is a curing agent of the type that undergoes polyaddition with a polyepoxide by reaction.

As the reactive groups which react with the epoxy groups in the first polyaddition type curing agent, amino groups having active hydrogen, carboxyl groups, thiol groups, and the like are exemplified. That is, as the first polyaddition type curing agent, a chemical compound having two or more amino groups having active hydrogen, a chemical compound having two or more carboxyl groups, and a chemical compound having two or more thiol groups are preferred, and more preferably a chemical compound having two or more amino groups having active hydrogen is used.

Note that the amino group having active hydrogen refers to, specifically, primary amino group indicated by $—NH_2$ or secondary amino group indicated by $>NH$. In this description, active hydrogen which couples to an amino group will be referred to as "amine active hydrogen". Further, a chemical compound having an amino group having active hydrogen will be referred to as an amine compound having active hydrogen, a chemical compound having two or more amino groups having active hydrogen will be referred to as a polyamine compound having active hydrogen. Here, the secondary amino group having a primary amino group on its distal end, such as an N-amino alkyl substituted amino group or a hydrazinyl group, is counted as one as an amino group having active hydrogen. Moreover, in this description, unless otherwise noted, the "polyamine compound" will be referred to as a polyamine compound having active hydrogen.

As the chemical compounds having two or more reactive groups which react with the epoxy groups, specifically, polyamine compound, polycarboxylic acid anhydride, polyamide compound, polythiol compound, and the like are exemplified. In the present invention, a polyamine compound or polycarboxylic acid anhydride is preferably used. As the first polyaddition type curing agent, one of them may be used independently, or two or more of them may be used in combination.

As described above, the first polyepoxide component used for the first cured epoxy resin which is the main body of the water absorbing layer in the present invention is constituted only of at least two kinds of aliphatic polyepoxides with molecular weight of 800 to 3000 from the viewpoint of obtaining a high water absorbing property. Also the polyaddition type curing agent which is one of reactive raw materials of the first cured epoxy resin is preferably a chemical compound having no aromatic ring from the viewpoint of obtaining a high water absorbing property.

That is, even when the first polyepoxide component is constituted of aliphatic polyepoxides, if the first polyaddition type curing agent to be used has an aromatic ring, the cured epoxy resin obtained by reacting them becomes a cured epoxy resin having a relatively large number of aromatic rings, and thus there is a concern that the water absorbing property becomes insufficient.

Therefore, the first polyaddition type curing agent is preferably a polyamine compound, polythiols, or polycarboxylic acid anhydrides having no aromatic ring, and the polyamine compound having no aromatic ring is particularly preferred. As the polyamine compound, a polyamine compound having two to four amino groups having active hydrogen is preferred. As the polythiol compound, a polyether polythiol is preferred. As the polycarboxylic acid anhydride, a dicarboxylic acid anhydride, a tricarboxylic acid anhydride, and a tetracarboxylic acid anhydride are preferred.

As the polyamine compound having no aromatic ring, an aliphatic polyamine compound and an alicyclic polyamine compound are exemplified. As these polyamine compounds, specifically, ethylene diamine, triethylene diamine, triethylenetetramine, tetraethylenepentamine, hexamethylene diamine, polyoxyalkylene polyamine, isophoronediamine, menthene diamine, 3,9-bis(3-aminopropyl)-2,4,8,10-tetraoxaspiro(5,5) undecane, and the like are exemplified.

The above polyoxyalkylene polyamine is a polyamine having a structure in which the hydroxyl groups of polyoxyalkylene polyol are substituted by amino groups, and for example, there is a chemical compound having two to four amino groups having a structure in which the hydroxyl groups of polyoxypropylene polyol having two to four hydroxyl groups are substituted by amino groups having active hydrogen. The molecular weight per amino group is preferably 1000 or less, particularly preferably 500 or less. As the polycarboxylic acid anhydride having no aromatic ring, for example, succinic anhydride, methyltetrahydrophthalic anhydride, hexahydrophthalic anhydride, 4-methylhexahydrophthalic anhydride, and the like are exemplified.

It is also possible to use commercial products for the first polyaddition type curing agent. As such commercial products, specifically, Jeffamine T-403 (trade name, made by Huntsman, Mw: 390) or the like as a polyoxyalkylene triamine, and Polythiol QE-340M (trade name, made by Toray Fine Chemicals) or the like as a polyether polythiol are exemplified.

Regarding the compounding ratio of the first polyepoxide component and the first polyaddition type curing agent as raw material components of the first cured epoxy resin used in the present invention, when the reactive groups of the first polyaddition type curing agent are group which react with the epoxy groups by the ratio of 1:1, the equivalent ratio of the reactive groups of the first polyaddition type curing agent relative to the epoxy groups derived from the first polyepoxide component is preferably a ratio of 0.8 to 1.2, more preferably 1.0 to 1.1. When the first polyaddition type curing agent having the reactive groups which react with the epoxy groups by 1:1 is used, the equivalent ratio of the reactive groups of the first polyaddition type curing agent relative to the epoxy groups derived from the first polyepoxide component is in the above range, a cured epoxy resin can be obtained which has a three-dimensional network structure which moderately cross linked so as to have the above water absorbing property without decreasing durability such as abrasion resistance and moisture resistance.

When the polyamine compound having active hydrogen as the first polyaddition type curing agent is used in the present invention, preferably, it is used so that the equivalent ratio of amine active hydrogen to the epoxy groups derived from the first polyepoxide component becomes a ratio of 0.6 to 0.8. Similarly to the above, when the equivalent ratio of amine active hydrogen to the epoxy groups is in the above range, a cured epoxy resin can be obtained which has a three-dimensional network structure which moderately cross linked so as to have the above water absorbing property without significantly changing into yellow.

Note that the equivalent ratio of amine active hydrogen to the epoxy groups is preferably in the range similar to the above also when it is calculated for the entire solid amount contained in the water absorbing layer forming composition. That is, when various components described below other than the first polyepoxide component and the first polyaddition type curing agent contained in the water absorbing layer forming composition, for example the coupling agent or the like, have epoxy groups and/or amino groups having active hydrogen, the total amount of adding the amounts of epoxy groups and amine active hydrogen contained in these components to the amounts of epoxy groups and amine active hydrogen contained in the first polyepoxide component and the first polyaddition type curing agent is preferably used for calculating the equivalent ratio of amine active hydrogen to the epoxy groups to make it the same as the above range of equivalent ratio. However, in components which will be described later, amine active hydrogen contained in a catalyst type curing agent such as imidazole basically does not cross link with the epoxy groups, and thus is not included in the calculation of the above equivalent ratio.

(First Catalyst Type Curing Agent)

When the first cured epoxy resin used in the present invention is obtained, the first catalyst type curing agent is used in addition to the first polyepoxide component and the first polyaddition type curing agent. As the first catalyst type curing agent, a catalyst type curing agent can be used without any particular restriction as long as it is a catalyst such as Lewis acid and catalyzes a polymerization reaction of polyepoxides with each other and/or a polyaddition reaction of a polyepoxide and a polyaddition type curing agent.

By using the first catalyst type curing agent, an effect of accelerating the speed of cross linking by polyaddition reaction of the first polyepoxide component and the first polyaddition type curing agent and an effect of reducing a defect occurring in a cross-linking portion formed by the first polyepoxide component and the first polyaddition type curing agent can be obtained. As one example of the defect of the cross-linking portion, coloring of a cured epoxy resin due to deterioration of a cross-linking portion by a heat load is exemplified.

As the first catalyst type curing agent, specifically, cured catalysts such as tertiary amines, imidazoles, Lewis acids, onium salts, and phosphines are exemplified. More specifically, 2-methylimidazole, 2-ethyl-4-methylimidazole, tris (dimethylaminomethyl) phenol, boron trifluoride-amine complex, methyl p-toluenesulfonate, diphenyl iodonium hexafluorophosphate, triphenyl sulfonium hexafluorophosphate, and the like are exemplified. As the first catalyst type curing agent, one of them may be used independently, or two or more of them may be used in combination.

Note that the onium salts such as diphenyl iodonium hexafluorophosphate and triphenyl sulfonium hexafluorophosphate exemplified above are catalyst type curing agents which decompose due to light of ultraviolet rays or the like to generate a Lewis acid catalyst, and normally used as a catalyst type curing agent giving a cured epoxy resin of light-curing type.

As the first catalyst type curing agent used in the present invention, among them, imidazole compounds such as 2-methylimidazole and 2-ethyl-4-methylimidazole are preferred.

As the first catalyst type curing agents, it is also possible to use commercial products. As such commercial products, for example, Adekaoptomer SP-152 (trade name, made by ADEKA) or the like as a triarylsulfonium salt which is a catalyst type curing agent of light-curing type is exemplified.

The use amount of the first catalyst type curing agent is preferably 1.0 to 20 mass %, more preferably 1 to 10 mass %, particularly preferably 1 to 5 mass % relative to 100 mass % of the first polyepoxide component. When the use amount of the first catalyst type curing agent relative to 100 mass % of the first polyepoxide component is 1.0 mass % or more, the reaction proceeds sufficiently, and a sufficient water absorbing property and durability can be realized in the obtained first cured epoxy resin. Further, when the use amount of the first catalyst type curing agent relative to 100 mass % of the first polyepoxide component is 20 mass % or less, it is possible to easily suppress occurrence of problem in appearance such that residues of the first catalyst type curing agent exist in the obtained first cured epoxy resin causing the cured epoxy resin to change into yellow.

(Water Absorbing Layer Forming Composition)

The water absorbing layer in the antifogging film of the antifogging article of the present invention is a water absorbing layer which contains a first cured epoxy resin as a main body obtained by reacting a water absorbing layer forming composition containing the first polyepoxide component, the first polyaddition type curing agent, and the first catalyst type curing agent.

The first polyepoxide component, the first polyaddition type curing agent, and the first catalyst type curing agent contained in the water absorbing layer forming composition are as described above including preferred modes, such as chemical compound used and ratios when combined, and the like. The water absorbing layer forming composition normally contains a solvent other than the first polyepoxide component, the first polyaddition type curing agent, and the first catalyst type curing agent. Further, besides them, a reactive additive such as coupling agent, and a non-reactive additive such as filler, antioxidant, ultraviolet absorbent, infrared absorbent, light stabilizer, and the like are contained as necessary.

Normally, the reaction of the first polyepoxide component and the first polyaddition type curing agent under the existence of the first catalyst type curing agent for obtaining the water absorbing material whose main body is the first cured epoxy resin is performed after it is applied as the water absorbing layer forming composition on an application surface (on a substrate or a base layer). When the composition contains a solvent, these components may be reacted in advance to a certain extent in the composition before it is applied on the application surface, and thereafter it may be applied on the application surface, dried, and subsequently further reacted. In this manner, when the first polyepoxide component and the first polyaddition type curing agent are reacted to a certain extent in a solvent in advance as the water absorbing layer forming composition, the reaction temperature for reacting in advance is preferably 30° C. or more because the curing reaction proceeds securely.

(Solvent)

The solvent used for the water absorbing layer forming composition is not particularly limited as long as it is a solvent having good solubility with respect to the compounded components including the first polyepoxide component, the first polyaddition type curing agent, the first catalyst type curing agent, and other arbitrary components and is also a solvent inert to these compounded components, and specifically, alcohols, acetic esters, ethers, ketone, water, and the like are exemplified.

Note that when a protic solvent is used as the solvent, the solvent and the epoxy groups can react and make it difficult for the cured epoxy resin to be formed, depending on the type of the first polyepoxide component. Therefore, when the protic solvent is used, preferably a solvent which does not easily react with the first polyepoxide component is selected. As usable protic solvents, ethanol, isopropyl alcohol, n-propyl alcohol, and the like are exemplified. Further, as solvents besides them, acetone, methyl ethyl ketone, butyl acetate, propylene carbonate, diethylene glycol dimethyl ether, diacetone alcohol, propylene glycol monomethyl ether, and the like are exemplified.

One of these solvents may be used, or two or more of them may be used in combination. Further, the compounded components such as the first polyepoxide component, the first polyaddition type curing agent, and the first catalyst type curing agent are prepared as a mixture with a solvent in some cases. In this case, the solvent contained in this mixture may be used as it is as the solvent in the water absorbing layer forming composition, and other than this, the same or different kind of solvent may be further added to the water absorbing layer forming composition.

Further, the amount of solvent in the water absorbing layer forming composition is preferably 100 to 500 mass %, more preferably 100 to 300 mass % relative to 100 mass % of the total mass of the entire solid amount of the first polyepoxide component, the first polyaddition type curing agent, the first catalyst type curing agent, and other various compounded components which are compounded arbitrarily.

Here, regarding the compounding amount of the first polyepoxide component, the first polyaddition type curing agent, and the first catalyst type curing agent in the water absorbing layer forming composition, preferably, the first polyepoxide component is 15 to 30 mass %, more preferably 20 to 30 mass % relative to the entire composition amount.

The compounding amounts of the first polyaddition type curing agent and the first catalyst type curing agent in the water absorbing layer forming composition are each as described above as the compounding amount relative to the first polyepoxide component. Note that the total amount of the compounding amounts of the first polyaddition type curing agent and the first catalyst type curing agent is preferably 3 to 25 mass %, more preferably 3 to 10 mass % relative to the total composition amount.

The compounding ratio of the first polyaddition type curing agent and the first catalyst type curing agent depends on the type of the curing agent to be used. For example, when the polyamine compound having active hydrogen as the first polyaddition type curing agent and the imidazole compound as the first catalyst type curing agent are used in combination, preferably, the polyamine compound having active hydrogen is compounded by the ratio of 3 to 15 mass %, and the imidazole compound is compounded by the ratio of 0.1 to 1.0 mass %, relative to the total amount of the water absorbing layer forming composition. By such compounding ratios, advantages which the first polyaddition type curing agent and the first catalyst type curing agent can both be exhibited effectively.

As a reactive additive among additives contained arbitrarily in the water absorbing layer forming composition, a chemical compound having one reactive group reactive to the first polyepoxide component such as alkyl monoamine, a coupling agent having a reactive group reactive to the first polyepoxide component and/or the first polyaddition type curing agent, such as an epoxy group or an amino group and the like are exemplified.

(Coupling Agent)

A coupling agent in the water absorbing layer forming composition is a component compounded for the purpose of improving adhesiveness of the water absorbing layer and the substrate or the water absorbing layer and the base layer when the antifogging article has the base layer, or adhesiveness of the water absorbing layer and a functional layer layered thereon as necessary, and is one of components preferred to be compounded.

As the coupling agent to be used, an organic metal-based coupling agent or a polyfunctional organic compound is preferred, and the organic metal-based coupling agent is particularly preferred. The organic metal-based coupling agent is a chemical compound having one or more bonds between a metal atom and a carbon atom, and preferably there is one bond or two bonds between the metal atom and the carbon atom. As the organic metal-based coupling agent, for example, a silane-based coupling agent (hereinafter referred to as a silane coupling agent), titanium-based coupling agent, aluminum-based coupling agent, and the like are exemplified, and the silane coupling agent is preferred. These coupling agents preferably has a reactive group which can react with the reactive groups contained in the first polyepoxide component and the first polyaddition type curing agent or reactive groups remaining in the surface of the substrate or the base layer which will be described later. Note that besides the purpose to improve adhesiveness between layers by having such reactive groups, it is used also for the purpose of adjusting properties of the water absorbing layer.

The silane coupling agent is a chemical compound in which one or more hydrolyzable groups and one or more monovalent organic groups (however, a distal end bonding to a silicon atom is a carbon atom) bond to a silicon atom, and one monovalent organic group is a functional organic group (organic group having a reactive group). As an organic group other than the functional organic group, an alkyl group having four or less carbon atoms is preferred. Preferably there are two or three hydrolyzable groups bonding to a silicon atom. The silane coupling agent is preferably a chemical compound represented by the following expression (1).

$$R^3R^4_cSiX^2_{3-c} \qquad (1)$$

In the above expression (1), $R^3$ represents a monovalent functional organic group, $R^4$ represents an alkyl group having four or less carbon atoms, and c represents an integer of 0 or 1. $R^4$ is preferably a methyl group or an ethyl group, particularly preferably a methyl group. $X^2$ is a hydrolyzable group such as a chlorine atom, alkoxy group, acyl group, and amino group, and particularly an alkoxy group having four or less carbon atoms is preferred.

As the monovalent functional organic group represented by $R^3$, an alkenyl group having an addition-polymerizable unsaturated group or an alkyl group having a reactive group is preferred. The alkyl group having the reactive group may be an alkyl group substituted by an organic group having a reactive group. The number of carbon atoms of such an alkyl group is preferably one to four. As the reactive group, epoxy group, amino group, mercapto group, ureide group, hydroxyl group, carboxyl group, acryloxy group, methacryloxy group, isocyanate group, and the like are exemplified. Further, as the organic group having such a reactive group, glycidyloxy group (glycidoxy group), epoxycyclohexyl group, alkyl amino group, dialkyl amino group, arylamino group, N-amino alkyl substituted amino group, and the like are exemplified. Among them, a silane coupling agent whose reactive group is epoxy group, amino group, mercapto group, ureide group is preferred.

As such silane coupling agent, for example, 2-(3,4-epoxycyclohexyl) ethyltrimethoxysilane, 3-glycidoxypropyltrimethoxysilane, 3-glycidoxypropyltriethoxysilane, 3-glycidoxypropylmethyldiethoxysilane, 3-methacryloxypropylmethyldimethoxysilane, 3-methacryloxypropyltrimethoxysilane, 3-acryloxypropyltrimethoxysilane, 3-isocyanatepropyltrimethoxysilane, N-(2-aminoethyl)-3-aminopropylmethyldimethoxysilane, N-(2-aminoethyl)-3-aminopropyltrimethoxysilane, 3-aminopropyltrimethoxysilane, 3-aminopropylmethyldimethoxysilane, N-phenyl-3-aminopropyltrimethoxysilane, 3-ureidopropyltriethoxysilane, 3-mercaptopropyltrimethoxysilane are exemplified.

Among them, 3-aminopropyltrimethoxysilane, 3-aminopropylmethyldimethoxysilane, N-(2-aminoethyl)-3-aminopropylmethyldimethoxysilane, N-(2-aminoethyl)-3-aminopropyltrimethoxysilane, 3-glycidoxypropyltrimethoxysilane, 3-glycidoxypropyltriethoxysilane, 3-glycidoxypropylmethyldiethoxysilane, 3-methacryloxypropylmethyldimethoxysilane, 3-methacryloxypropyltrimethoxysilane, 3-acryloxypropyltrimethoxysilane, and the like are preferred.

In the present invention, among them in particular, a silane coupling agent having an amino group such as 3-aminopropyltrimethoxysilane, 3-aminopropylmethyldimethoxysilane, N-(2-aminoethyl)-3-aminopropylmethyldimethoxysilane, or N-(2-aminoethyl)-3-aminopropyltrimethoxysilane, is preferably used.

For the compounding amount of the coupling agent in the water absorbing layer forming composition, there is no lower limit because it is not an essential component. However, in order to sufficiently exhibit the effect of compounding the coupling agent, the mass fraction of the coupling agent is preferably 5 to 40 mass %, more preferably 10 to 30 mass % relative to 100 mass % of the total mass of the first polyepoxide component, the first polyaddition type curing agent, and the first catalyst type curing agent in the water absorbing layer forming composition.

An upper limit of the compounding amount of the coupling agent is restricted by properties and functions of the coupling agent. When used for the purpose of improving adhesiveness of the water absorbing layer whose main body is the first cured epoxy resin, the mass fraction of the coupling agent relative to 100 mass % of the total mass of the first polyepoxide component, the first polyaddition type curing agent, and the first catalyst type curing agent is preferably 40 mass % or less, more preferably 30 mass % or less. By preventing the use amount of the coupling agent from becoming excessive, it is possible to prevent coloring of the water absorbing material whose main body is the first cured epoxy resin due to oxidation when exposed to high temperature, or the like.

Note that the compounding amount of the coupling agent relative to the total amount of the water absorbing layer forming composition is preferably 2 to 10 mass %, more preferably 3 to 7 mass % when, for example, the silane coupling agent is used. Further, to mention about a particularly preferred composition in the water absorbing layer forming composition containing the silane coupling agent, a composition is exemplified which contains the first polyepoxide component of 15 to 30 mass %, the polyamine compound having active hydrogen of 3 to 15 mass %, the imidazole compound of 0.1 to 1.0 mass %, the silane coupling agent of 2 to 10 mass %, and the solvent of 50 to 75 mass % relative to the total amount of composition.

Here, when the water absorbing layer forming composition contains the coupling agent having an amino group having active hydrogen as the coupling agent, regarding the equivalent ratio of amine active hydrogen relative to the epoxy groups, an equivalent ratio relative to the epoxy groups contained in the first polyepoxide component is calculated together with amine active hydrogen in the first polyaddition type curing agent and amine active hydrogen contained in the coupling agent, and is made to be in the above preferred range. Further, when the first polyaddition type curing agent having a reactive group other than the amino group having active hydrogen and the coupling agent having an amino group having active hydrogen are used together, the sum of the equivalent ratio of the active hydrogen contained in the reactive group of the first polyaddition type curing agent relative to the epoxy groups contained in the first polyepoxide component and the equivalent ratio of the amine active hydrogen contained in the coupling agent relative to the epoxy groups is made to be in the above preferred range.

Similarly, when the water absorbing layer forming composition contains the coupling agent having an epoxy group as the coupling agent, regarding the equivalent ratio of amine active hydrogen relative to the epoxy groups or active hydrogen contained in the reactive groups, an equivalent ratio relative to the amine active hydrogen or the active hydrogen contained in the reactive group in the first polyaddition type curing agent are calculated together with the epoxy groups contained in the first polyepoxide component and the epoxy groups contained in the coupling agent, and is made to be in the above preferred range.

(Filler)

The water absorbing layer forming composition preferably further includes a filler as an arbitrary component. By including the filler, mechanical strength and heat resistance of the formed water absorbing layer can be increased, and shrinkage on curing of a resin at a time of curing reaction can be decreased. As such a filler, a filler constituted of a metal oxide is preferred. As the metal oxide, for example, silica, alumina, titania, zirconia are exemplified, and among them, silica is preferred.

The filler contained in the water absorbing layer forming composition is preferably particulate, and a mean primary particle diameter thereof is preferably 300 nm or less, more preferably 100 nm or less, furthermore preferably 50 nm or less. When the mean primary particle diameter is 300 nm or less, a tendency to aggregate among particles in the composition containing it is not enhanced, and sedimentation of particles can be avoided. Further, when a water absorbing layer is formed of a composition containing this, generation of haze due to scattering can be suppressed, and thus the above particle diameter is preferred in terms of maintaining transparency. Note that although a lower limit of the mean primary particle diameter is not particularly limited, it is possible to use particles of approximately 2 nm, which can be manufactured by the current technology. Here, the mean primary particle diameter of particles refers to that measured from an observation image by a transmission electron microscope.

Further, the compounding amount of the filler is preferably 0.5 to 30 mass %, more preferably 1 to 25 mass % relative to 100 mass % of the total mass of the first polyepoxide component, the first polyaddition type curing agent, and the first catalyst type curing agent. Hereinafter, the first polyepoxide component, the first polyaddition type curing agent, and the first catalyst type curing agent may also be referred together to as a "resin component".

When the compounding amount of the filler relative to 100 mass % of the total mass of the resin components is 0.5 mass % or more, it is easy to suppress decrease in effect of decreasing shrinkage on curing of the water absorbing material whose main body is the first cured epoxy resin. Further, when the compounding amount of the filler relative to 100 mass % of the total mass of the resin components is 30 mass % or less, the space for absorbing water can be secured efficiently, and it is possible to easily increase the antifogging performance.

The silica used preferably as the filler, more preferably silica particles can be compounded in the water absorbing layer forming composition as colloidal silica dispersed in water or organic solvent such as methanol, ethanol, isopropyl alcohol, isobutanol, propylene glycol monomethyl ether, or butyl acetate. As the colloidal silica, there are silica hydrosol dispersed in water and organo silica sol in which water is substituted by organic solvent, when it is compounded in the water absorbing layer forming composition, organo silica sol in which an organic solvent similar to the organic solvent used preferably in this composition is used as a dispersion medium is preferably used.

As such organo silica sol, a commercial product can be used. As the commercial product, for example, organo silica sol IPA-ST (trade name, made by Nissan Chemical Industries) in which silica particles having a particle diameter of 10 to 20 nm are dispersed in isopropyl alcohol by the ratio of 30 mass % as the content of $SiO_2$ relative to the amount of the entire organo silica sol, organo silica sol NBAC-ST (trade name, made by Nissan Chemical Industries) in which the organic solvent of the organo silica sol IPA-ST is changed from the isopropyl alcohol to butyl acetate, and organo silica sol MEK-ST (trade name, made by Nissan Chemical Industries) in which organic solvent of the organo silica sol IPA-ST is changed from the isopropyl alcohol to methyl ethyl ketone, and the like are exemplified. Note that when the colloidal silica is used as the silica particles, the amount of solvent compounded in the water absorbing layer forming composition is adjusted appropriately by taking the amount of solvent contained in the colloidal silica is taking into consideration.

(Antioxidant)

The water absorbing layer forming composition preferably contains an antioxidant as an arbitrary component for increasing weather resistance of the obtained water absorbing layer. When the first cured epoxy resin mainly constituting the water absorbing layer is exposed to heat and/or light and oxidizes and deteriorates, stress accumulation easily occurs in the water absorbing layer, and thereby peeling of the antifogging film occurs easily. By adding the antioxidant, it becomes possible to suppress such a phenomenon. As the antioxidant, phenolic antioxidant of the type suppressing oxidation of resin by capturing and decomposing peroxy radical, phosphorus antioxidant and sulfur antioxidant of the types suppressing oxidation of resin by decomposing peroxide, and the like are exemplified. In the present invention, preferably, the phenolic antioxidant is used.

As the phenolic antioxidant, the following phenolic antioxidants can be used without any particular limitation which are normally compounded in the cured epoxy resin. One of them may be used independently, or two of them may be used in combination.

Pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexan-1,6-diylbis[3-(3,5-di-tert-butyl-4-hydroxyphenyl)propionamide], 2,4-dimethyl-6-(1-methylpentadecyl)phenol, diethyl [[3,5-bis(1,1-dimethylethyl)-4-hydroxyphenyl]methyl]phosphonate, 3,3'', 3'', 5, 5', 5''-hexa-tert-butyl-a,a'a''-(mesitylene-2,4,6-triyl) tri-p-cresol, calcium diethyl bis[[[3,5-bis(1,1-dimethylethyl)-4-hydroxyphenyl]methyl]phosphonate], 4,6-bis(octyl thiomethyl)-o-cresol, ethylene bis(oxyethylene)bis[3-(5-di-tert-butyl-4-hydroxy-m-tolyl) propionate], hexamethylene bis[[3-(3,5-di-tert-butyl-4-hydroxyphenyl)propionate, 1,3,5-tris(3,5-di-tert-4-butyl-4-hydroxybenzyl)-1,3,5-triazine-2,4,6(1H,3H,5H)-trione, 1,3,5-tris(4-tert-butyl-3-hydroxy-2,6-xylyl)methyl]-1,3,5-triazine-2,4,6(1H,3H,5H)-trione, reaction product of N-phenyl benzene amine and 2,4,4-trimethyl pentene, 2,6-di-tert-butyl-4-(4,6-bis(octyl thio)-1,3,5-triazine-2-ylamino) phenol, and the like.

As the commercial product of the phenolic antioxidant, IRGANOX 1010, IRGANOX 1035, IRGANOX 1076, IRGANOX 1135 (all of which are trade names, made by BASF), ADK STAB AO-30, ADK STAB AO-40, ADK STAB AO-50, ADK STAB AO-60, ADK STAB AO-70, ADK STAB AO-80, ADK STAB AO-90, and ADK STAB A-611 (all of which are trade names, made by ADEKA), Sumilizer GA-80, Sumilizer MDP-S, Sumilizer BBM-S, Sumilizer GM, Sumilizer GS(F), Sumilizer GP (all of which are trade names, made by Sumitomo Chemical), and the like are exemplified.

Further, the amount of the antioxidant compounded in the water absorbing layer forming composition is preferably 0.5 to 2 mass %, more preferably 0.5 to 1 mass % relative to 100 mass % of the total mass of the first polyepoxide component, the first polyaddition type curing agent, and the first catalyst type curing agent.

(Ultraviolet Absorbent)

The water absorbing layer forming composition preferably includes an ultraviolet absorbent as an arbitrary component for increasing weather resistance, particularly resistance to ultraviolet rays, of the obtained water absorbing layer. As the ultraviolet absorbent, conventionally publicly known ultraviolet absorbent, specifically, benzophenone-based compound, triazine-based compound, benzotriazole-based compound, and the like are exemplified.

As the benzotriazole-based ultraviolet absorbent, specifically, 2-[5-chloro(2H)-benzotriazole-2-yl]-4-methyl-6-(tert-butyl) phenol (TINUVIN 326 (trade name, made by BASF) or the like as a commercial product), octyl-3-[3-tert-4-hydroxy-5-[5-chloro-2H-benzotriazole-2-yl]propionate, 2-(2H-benzotriazole-2-yl)-4,6-di-tert-pentyl phenol, 2-(2-hydroxy-5-methylphenyl)benzotriazole, 2-[2-hydroxyl-3-(3,4,5,6-tetrahydrophthalimide-methyl)-5-methylphenyl] benzotriazole, 2-(2-hydroxy-5-tert-octylphenyl) benzotriazole, 2-(2-hydroxy-5-tert-butylphenyl)-2H-benzotriazole, methyl 3-(3-(2H-benzotriazole-2-yl)-5-t-butyl-4-hydroxyphenyl)propionate, 2-(2H-benzotriazole-2-yl)-4,6-bis(1-methyl-1-phenylethyl)phenol, 2-(2H-benzotriazole-2-yl)-6-(1-methyl-1-phenylethyl)-4-(1,1,3,3-tetramethylbutyl)phenol, and the like are exemplified. Among them, preferably, 2-[5-chloro(2H)-benzotriazole-2-yl]-4-methyl-6-(tert-butyl) phenol is used.

As the triazine-based ultraviolet absorbent, specifically, 2-[4-[(2-hydroxy-3-dodecyloxy propyl)oxy]-2-hydroxyphenyl]-4,6-bis(2,4-dimethyl phenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butoxyphenyl)-6-(2,4-bis-butoxyphenyl)-1,3,5-triazine, 2-(2-hydroxy-4-[1-octylcarbonylethoxy]phenyl)-4,6-bis(4-phenylphenyl)-1,3,5-triazine, TINUVIN 477 (trade name, made by BASF), TINUVIN 400 (trade name, made by BASF), and the like are exemplified. Among them, preferably, 2-(2-hydroxy-4-[1-octylcarbonylethoxy]phenyl)-4,6-bis(4-phenyl phenyl)-1,3,5-triazine) is used.

As the benzophenone-based ultraviolet absorbent, specifically, 2,4-dihydroxybenzophenone, 2,2',3(or 4,5,6)-trihydroxybenzophenone, 2,2',4,4'-tetrahydroxybenzophenone, 2,4-dihydroxy-2',4'-dimethoxybenzophenone, 2-hydroxy-4-n-octoxybenzophenone, and the like are exemplified. Among them, preferably, 2,2',4,4'-tetrahydroxybenzophenone is used.

The maximum absorption wavelength of light of these exemplified ultraviolet absorbents is in the range of 325 to 425 nm, and is often in the range of approximately 325 to 390 nm. Thus, an ultraviolet absorbent having absorptivity to ultraviolet rays of relatively long wavelengths is preferably used due to its characteristics.

In the present invention, one of these ultraviolet absorbents can be used independently, or two or more of them can be used in combination. Further, among these ultraviolet absorbents, since solubility to solvent and absorption wavelength range are desired in the water absorbing layer forming composition used in the present invention, preferably, the benzophenone-based ultraviolet absorbent containing a hydroxyl group as illustrated above is used. Further, a hydroxylphenyl triazine-based ultraviolet absorbent is also preferred.

The compounding amount of the ultraviolet absorbent in the water absorbing layer forming composition is preferably 0.5 to 5 mass %, more preferably 0.5 to 1 mass % relative to 100 mass % of the total mass of the first polyepoxide component, the first polyaddition type curing agent, and the first catalyst type curing agent from the point that the water absorbing layer formed by using it does not impair the effects of the present invention and also has sufficient ultraviolet resistance.

(Infrared Absorbent)

The water absorbing layer forming composition preferably contains an infrared absorbent as an arbitrary component in order to give the obtained water absorbing layer a heat insulating effect by shielding against infrared rays. As the infrared absorbent, an infrared absorbent constituted of inorganic compound particles, an infrared absorbent constituted of an organic dye, and the like are exemplified.

As the infrared absorbent constituted of inorganic compound, specifically, particles of metals such as Re, Hf, Nb, Sn, Ti, Si, Zn, Zr, Fe, Al, Cr, Co, Ce, In, Ni, Ag, Cu, Pt, Mn, Ta, W, V, Mo; oxide, nitride, sulfide, silicide of these metals; or inorganic compound obtained by doping a dopant such as Sb, F or Sn, to them are exemplified. These inorganic compound particles can be used independently or in a combination of two or more of them.

The mean primary particle diameter in the inorganic compound particles used as the infrared absorbent can be the same as the mean primary particle diameter of the above filler including a preferred particle diameter.

Among the inorganic compound particles used as the infrared absorbent, in the present invention, tin-doped indium oxide (ITO) particles, antimony-doped tin oxide (ATO) particles, composite tungsten oxide, lanthanum hexaboride (LaB6), and the like are preferred.

As the composite tungsten oxide, specifically, a composite tungsten oxide denoted by a general expression: $M_xW_yO_z$ (where element M is one or more elements selected from Cs, Rb, K, Tl, In, Ba, Li, Ca, Sr, Fe, Sn, W is tungsten, O is oxygen, $0.001 \leq x/y \leq 1$, $2.2 \leq z/y \leq 3.0$) is exemplified. In the composite tungsten oxide denoted by the general formula, a sufficient amount of free electrons is generated, and thus it can function effectively as the infrared absorbent. The particles of the composite tungsten oxide indicated by the above general formula: $M_xW_yO_z$ excel in durability when they have a hexagonal crystal, tetragonal crystal, or cubic crystal structure, and hence it preferably includes one or more crystal structures selected from hexagonal crystal, tetragonal crystal, and cubic crystal structure. As the composite tungsten oxide, specifically, $Cs_{0.33}WO_3$, $Rb_{0.33}WO_3$, $K_{0.33}WO_3$, $Ba_{0.33}WO_3$, and the like are exemplified.

Such a composite tungsten oxide is an infrared absorbent which is known for that its transmittance has a maximum value in wavelengths of 400 to 700 nm and a minimum value in wavelengths of 700 to 1800 nm in the film in which its particles are dispersed evenly.

The crystal systems of the ATO particles and the ITO particles are not limited to an ordinary cubic crystal, and depending on the type of the first cured epoxy resin, for example, a hexagonal crystal ITO with relatively low infrared absorptivity can be used as necessary.

In the present invention, the ITO particles are used preferably in terms of transmittance loss and environmental safety. Here, a mixing ratio of tin oxide and indium oxide in the ITO particles which exhibit infrared absorptivity is, when it is represented by "In/Sn"; the number of indium atoms relative to the number of tin atoms, preferably In/Sn=5 to 40, more preferably In/Sn=7 to 25.

As the infrared absorbent constituted of an organic dye, polymethine-based dye, phthalocyanine-based dye, naphthalocyanine-based dye, metal complex-based dye, aminium-based dye, imonium-based dye, diimonium-based dye, anthraquinone-based dye, dithiol metal complex-based dye, naphthoquinone-based dye, indol phenol-based dye, azo-based dye, triaryl methane-based dye, and the like are exemplified. These organic dyes can be used independently or in a combination of two or more of them. Further, they may be used in combination with the inorganic compound particles.

The compounding amount of the infrared absorbent in the water absorbing layer forming composition is, from the point that the water absorbing layer formed by using this does not impair the effects of the present invention and has a heat insulating effect by sufficient shielding against infrared rays, preferably 0.5 to 15 mass %, more preferably 10 to 15 mass % relative to 100 mass % of the total mass of the first polyepoxide component, the first polyaddition type curing agent, and the first catalyst type curing agent.

Note that when inorganic chemical particles are compounded as the infrared absorbent, the inorganic chemical particles also exhibit the function as a filler together. Therefore, in this case, it is possible to decrease the compounding amount of the filler by the compounding amount of the inorganic chemical particles.

(Light Stabilizer)

The water absorbing layer forming composition preferably includes a light stabilizer as an arbitrary component in order to give light stability to the obtained water absorbing layer. As the light stabilizer, hindered amines; nickel complex such as nickel bis(octyl phenyl) sulfide, nickel complex-3,5-di-tert-butyl-4-hydroxy benzyl phosphoric acid monoethylate, nickel dibutyl dithiocarbamate, and the like are exemplified. In the present invention, these light stabilizers can be used independently or in a combination of two or more of them.

Among them, as the light stabilizer used in the present invention, the hindered amines are preferred, and a hindered amine-based light stabilizer in which an amine portion is capped with an alkyl group or an alkoxy group, specifically, a chemical compound is preferred in which the 1-position is substituted by X and the 4-position is substituted by R in a chemical compound of 2,2,6,6-tetramethyl piperidine skeleton, having a substituted piperidine skeleton represented by the following general expression (2).

[Chemical Formula 1]

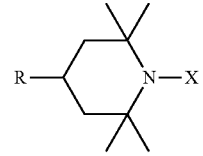

(2)

(In the expression (2), X represents an alkyl group or an alkoxy group, and R represents a monovalent organic group.)

In the general expression (2), as the alkyl group represented by X, specifically, a linear, branched, or cyclic alkyl group having 1 to 8 carbon atoms is exemplified.

Among them, in the present invention, the linear alkyl group having 1 to 3 carbon atoms is more preferred, and a methyl group, an ethyl group, and the like are preferred in particular. Further, in the general formula (2), as the alkoxy group represented by X, specifically, a linear, branched, or cyclic alkoxy group having 1 to 12 carbon atoms are exemplified. Among them, in the present invention, a linear or cyclic alkoxy group having 1 to 8 carbon atoms is more preferred, and a methoxy group, octyl oxy group, cyclohexyloxy group, and the like are particularly preferred.

Specific examples of the hindered amine-based light stabilizer represented by such general expression (2) will be described below with an example of a commercial product.

Bis-(1,2,2,6,6-pentamethyl-4-piperidyl)sebacate (as a commercial product, TINUVIN 765 (trade name, made by BASF) or the like), bis-(1,2,2,6,6-pentamethyl-4-piperidyl)-2-(3,5-di-t-butyl-4-hydroxy-benzyl)-2-n-butylmalonate (as a commercial product, TINUVIN 144 (trade name, made by BASF), or the like), a reaction product of decanedioic acid bis(2,2,6,6-tetramethyl-1-octyl oxy-4-piperidyl) ester and 1,1-dimethylethylhydroperoxide and octane (as a commercial product, TINUVIN 123 (trade name, made by BASF) or the like), a mixture of bis(1,2,2,6,6-pentamethyl-4-piperidyl)sebacate and methyl(1,2,2,6,6-pentamethyl-4-piperidyl)sebacate (as a commercial product, TINUVIN 292 (trade name, made by BASF) or the like)), tetrakis(1,2,2,6,6-pentamethyl-4-piperidyl)-1,2,3,4-butanetetracarboxylate (as a commercial product, ADK STAB LA-52 (trade name, made by ADEKA) or the like), 1,2,2,6,6-pentamethyl-4-piperidyl/tridecyl 1,2,3,4-butanetetracarboxylate (as a commercial product, ADK STAB LA-62 (trade name, made by ADEKA) or the like), ester of 1,2,3,4-butane tetracarboxylic acid and β,β,β',β'-tetramethyl-3,9-diethyl-{2,4,8,10-tetraoxaspiro[5.5]undecane}-α,α'-diol and 1,2,2,6,6-pentamethyl-4-piperidinyol (as a commercial product, ADK STAB LA-63 (trade name, made by ADEKA) or the like) are exemplified.

Further, as the hindered amine-based light stabilizer, it is also possible to use a commercial product, ADK STAB LA-72 (trade name, made by ADEKA) or the like.

The compounding amount of the light stabilizer in the water absorbing layer forming composition is preferably 0.5 to 5 mass %, more preferably 0.5 to 1 mass % relative to 100 mass % of the total mass of the first polyepoxide component, the first polyaddition type curing agent, and the first catalyst type curing agent from the point that the water absorbing layer formed by using this does not impair the effects of the present invention and has sufficient light stability.

From the viewpoint of improving a film formability, moreover, a leveling agent, defoamer, viscosity modifier, and/or the like can be added as necessary to the water absorbing layer forming composition.

As the leveling agent, polydimethylsiloxane-based surface conditioning agent, acrylic copolymer-based surface conditioning agent, fluorine-modified polymer-based surface conditioning agent, and the like are exemplified, and as the defoamer, organic defoamer such as silicone-based defoamer, surfactant, polyether, higher alcohol are exemplified, and as the viscosity modifier, acryl copolymer, polycarboxylic acid amide, modified urea compound, and the like are exemplified. Each component may combine two or more of the exemplified chemical compounds. Further, a hydrolyzable silane compound having a hydrophobic group, for example, a polyfluoroalkyl group or a long-chain alkyl group having 6 to 22 carbon atoms, or the like can be added to the water absorbing layer forming composition. The compounding amounts of various components in the water absorbing layer forming composition can be, regarding each component, 0.001 to 10 mass % relative to 100 mass % of the total mass of the first polyepoxide component, the first polyaddition type curing agent, and the first catalyst type curing agent.

(Water Absorbing Layer)

The water absorbing layer in the antifogging article of the present invention is constituted of a first cured epoxy resin as a main body having a three-dimensional network structure obtained by reaction of the first polyepoxide component and the first polyaddition type curing agent contained in the water absorbing layer forming composition under the existence of the first catalyst type curing agent, and by nature of the above-described first cured epoxy resin, the water absorbing layer has high water absorbing property and both durability, such as abrasion resistance and moisture resistance, and good appearance. Note that the conditions of the reaction will be explained in a manufacturing method which will be described later.

Further, the reactive additive added arbitrarily such as silane coupling agent exists in the water absorbing layer in the form of bonding to part of the three-dimensional network structure of this first cured epoxy resin, and moreover, any non-reactive additive which is arbitrarily added other than this exists in the water absorbing layer in an evenly dispersed and contained state in the three-dimensional network structure of the first cured epoxy resin.

[2-2] Base Layer

In the antifogging article of the present invention, the antifogging film formed on the surface of at least part of the substrate arbitrarily has a base layer constituted of a base material with a saturated water absorption amount of 10 mg/cm$^3$ or less, which is measured by the method described with the above water absorbing layer, formed together with the water absorbing layer between the substrate and the water absorbing layer.

When the antifogging article of the present invention has the base layer in this manner, the water absorbing property of the base material constituting the base layer is designed to be 10 mg/cm$^3$ or less by saturated water absorption amount that is lower than the water absorbing property of the water absorbing material constituting the water absorbing layer (50 mg/cm$^3$ or more by saturated water absorption amount). Moreover, the saturated water absorption amount of the base material constituting the base layer is preferably 8 mg/cm$^3$ or less.

By setting the saturated water absorption amount of the base material to be 10 mg/cm$^3$ or less, as described above, a difference in degree of expansion and contraction in the adhesive interface between the substrate and the antifogging film, actually the substrate and the base layer, becomes small, and it is possible to prevent peeling of the antifogging film from the substrate. As a result, an antifogging article excellent in acid resistance and alkali resistance can be obtained. On the other hand, from the viewpoint of decreasing the difference in degree of expansion and contraction in the base layer and the water absorbing layer in the antifogging film, the saturated water absorption amount of the base material constituting the base layer is preferably 1 mg/cm$^3$ or more, more preferably 3 mg/cm$^3$ or more.

Regarding the water absorbing property of the base layer provided in the antifogging article of the present invention, when the water absorbing and antifogging property described in the water absorbing layer is presented as an index, the water absorbing and antifogging property can be 10 seconds or less, 7 seconds or less in a further preferred embodiment, or 3 seconds or less in a particularly preferred embodiment. Note that, similarly to the above saturated water absorption amount, from the viewpoint of decreasing the difference in degree of expansion and contraction in the base layer and the water absorbing layer in the antifogging film, the water absorbing and antifogging property is preferably 1 second or more, more preferably 2 seconds or more.

From the relation between the saturated water absorption amount of the base material constituting the base layer and the water absorbing and antifogging property of the base layer, a film thickness of the base layer related to the antifogging article of the present invention is preferably 2 μm or more, more preferably 3 μm or more. When the film thickness of the base layer is 2 μm or more, it becomes possible to prevent peeling of the antifogging film from the substrate, and as a result, an antifogging article excellent in acid resistance and alkali resistance can be obtained. Further, also from a reason of alleviating stress occurring in the interface due to expansion and contraction of the water absorbing layer, the film thickness of the base layer is more preferably 3 μm or more. Further, the film thickness of the base layer is preferably 8 μm or less, more preferably 6 μm or less from the viewpoint of reducing material costs and improving non-defective ratio.

Here, the peeling resistance required for the base layer in the antifogging article differs depending on application, and thus the design of the base layer can be changed appropriately in line with required performance.

Although the base material constituting the base layer is not particularly limited as long as it has the water absorbing performance as described above, a material whose main body is a cured epoxy resin is preferred from the viewpoint of making good adhesiveness with the water absorbing layer, and a material whose main body is a second cured epoxy resin which can be obtained by reacting a base layer forming composition containing a polyepoxide component and a polyaddition type curing agent is more preferred. Hereinafter, a base layer whose main body is the second cured epoxy resin will be described. Note that in the following description, the polyepoxide component for obtaining the second cured epoxy resin will be referred to as a second polyepoxide component, and the polyaddition type curing agent will be referred to as a second polyaddition type curing agent.

(Base Layer Whose Main Body is the Second Cured Epoxy Resin)

As described above, in general, in order to increase the water absorbing performance of a resin layer constituted of a cured epoxy resin, preferably, the glass transition point of the cured epoxy resin is controlled to be low, and in order to increase durability, the glass transition point of the cured epoxy resin is controlled to be high. Considering these, the glass transition point of the second cured epoxy resin mainly constituting the base material is, although depending on the kind of the cured epoxy resin, preferably 40 to 150° C., more preferably 40 to 120° C.

When the glass transition point of the first cured epoxy resin of high water absorbing property mainly constituting the water absorbing layer is in the above range (−20 to 60° C., preferably −5 to 40° C.), and moreover the glass transition point of the second cured epoxy resin of low water absorbing property mainly constituting the base layer is a temperature in the above range and is also higher than the glass transition point of the first cured epoxy resin, the water absorbing property and durability of the antifogging film constituted of the base layer and the water absorbing layer from the substrate side can both be easily given at high level. The difference in glass transition point between the second cured epoxy resin and the first cured epoxy resin is preferably 10° C. or more, more preferably 20° C. or more.

Hereinafter, the second cured epoxy resin mainly constituting the base layer, obtained by reacting the second polyepoxide component and the second polyaddition type curing agent will be described.

(Second Polyepoxide Component)

As the second polyepoxide component which is a raw material component of the second cured epoxy resin, a polyepoxide appropriately selected from glycidyl ether-based polyepoxide, glycidyl ester-based polyepoxide, glycidyl amine-based polyepoxide, and the like, which are normally used as a raw material component for a cured epoxy resin, can be used so that the water absorbing property is in the above preferred range.

Although the molecular weight of the polyepoxide used as the second polyepoxide component is not particularly limited, from viewpoints of avoiding insufficient wet spreading of application liquid when a liquid composition (application liquid) containing this is applied on the substrate and appearance defect such as unevenness of a coating film, preferably a polyepoxide with a molecular weight of about 500 to 1000 is preferred. Further, although the number of epoxy groups per molecule of the polyepoxide in the second polyepoxide component is not particularly limited as long as it is two or more on average, it is preferably 2 to 10, more preferably 2 to 8, furthermore preferably 2 to 4.

Although the second polyepoxide component may be any one of aliphatic polyepoxide, alicyclic polyepoxide, and aromatic polyepoxide, for example, by choosing the aromatic polyepoxide, the three-dimensional network structure of the obtained cured epoxy resin can be made hard, and the water absorbing property can be lowered by making a space thereof small.

As the aromatic polyepoxide usable as the second polyepoxide component is, preferably, a polyepoxide having a structure in which phenolic hydroxyl group is replaced by a glycidyl oxy group is exemplified. Specifically, bisphenol diglycidyl ethers such as bisphenol-A diglycidyl ether, bisphenol-F diglycidyl ether, bis(4-glycidyl oxyphenyl), and the like, phenol-novolac diglycidyl ethers, cresol-novolac diglycidyl ethers, polyglycidyl aromatic polycarboxylates such as diglycidyl phtalate, and the like are exemplified.

Among these aromatic polyepoxides, as the second polyepoxide component, bisphenol-A diglycidyl ether and bisphenol-F diglycidyl ether are preferably used.

Note that also in the alicyclic polyepoxide, it is possible to make the space of the three-dimensional network structure small to lower the water absorbing property of the cured epoxy resin due to the existence of the cyclic structure depending on the kind and number of the cyclic structure. The alicyclic polyepoxide is a polyepoxide having an alicyclic hydrocarbon group (2,3-epoxycyclohexyl group, or the like) in which an oxygen atom bonds between adjacent carbon atoms of the ring, and specifically, 3,4-epoxycyclohexyl methyl-3',4'-epoxycyclohexane carboxylate, bis(3,4-epoxycyclohexyl methyl)adipate, and the like are exemplified.

Further, it is conceivable that even in the aliphatic polyepoxide which does not have a cyclic structure, when the number of crosslinking points is increased, the obtained cured epoxy resin becomes a dense three-dimensional network structure, the space for retaining water becomes small, and thus the water absorbing property decreases. As the aliphatic polyepoxide used for the second polyepoxide component, sorbitol polyglycidyl ether, pentaerythritol polyglycidyl ether, trimethylolpropane polyglycidyl ether, and the like are preferred, which are classified into aliphatic glycidyl ether-based polyepoxide derived from aliphatic polyols.

In the second polyepoxide component, the number of crosslinking points of the obtained second cured epoxy resin is increased to control the water absorbing property to be low, for example, when the second polyepoxide component is the aliphatic glycidyl ether-based polyepoxide derived from aliphatic polyols, the epoxy equivalent thereof is preferably 100 to 200, more preferably 100 to 150.

The second polyepoxide component may be constituted of one of these polyepoxides or two or more thereof.

Note that it is possible to use a commercial product also for the polyepoxide constituting the second polyepoxide component, similarly to the polyepoxide constituting the first polyepoxide component. As such a commercial product, other than the commercial product described for the first polyepoxide component, a commercial product of aliphatic polyepoxide with a lower molecular weight than them, jER828 (trade name, made by Mitsubishi Chemical Corporation) as the bisphenol-A diglycidyl ether, ADEKA Resin EP4901 (trade name, made by ADEKA) as the bisphenol-F diglycidyl ether, and the like are exemplified.

(Second Polyaddition Type Curing Agent)

The second cured epoxy resin mainly constituting the base layer is a second cured epoxy resin obtained by reacting the second polyepoxide component and the second polyaddition type curing agent.

The kinds of the polyaddition type curing agent usable as the second polyaddition type curing agent are similar to the first polyaddition type curing agent.

That is, as the second polyaddition type curing agent, a chemical compound having two or more amino groups having active hydrogen, a chemical compound having two or more carboxyl groups, and a chemical compound having two or more thiol groups are preferred, and more preferably, the chemical compound having two or more amino groups having active hydrogen is used.

As the second polyaddition type curing agent, for example, it is possible to lower the water absorbing property of the obtained cured epoxy resin by selecting a polyaddition type curing agent having an aromatic ring which is not selected as a preferred polyaddition type curing agent in the first polyaddition type curing agent. Although depending on the degree of the water absorbing property required for the base layer, when a chemical compound having an aromatic ring in at least one of the second polyepoxide component and the second polyaddition type curing agent is used, the water absorbing property of the obtained second cured epoxy resin can be set to the desired range.

Further, when a polyepoxide which does not have an aromatic ring is used as the second polyepoxide component, and a polyaddition type curing agent which does not have an aromatic ring as the second polyaddition type curing agent is further used, the water absorbing property of the obtained second cured epoxy resin can be set in the above desired range by combining so that the crosslinking points increase, or the like, as described above. Moreover, the second cured epoxy resin obtained in this manner having no aromatic ring excels in weather resistance as compared to the second cured epoxy resin having an aromatic ring.

As the polyaddition type curing agent having no aromatic ring, a curing agent similar to the polyaddition type curing agent having no aromatic ring described for the first polyaddition type curing agent can be used. Further, as the polyaddition type curing agent having an aromatic ring, a polyamine compound having an aromatic ring, aromatic polycarboxylic acid anhydride, and the like are exemplified. As a specific polyamine compound having an aromatic ring, for example, phenylenediamine, xylylenediamine, diaminodiphenylmethane, and the like are exemplified, and as the aromatic polycarboxylic acid anhydride, for example, phthalic anhydride, trimellitic anhydride, pyromellitic anhydride, and the like are exemplified.

As the second polyaddition type curing agent, one of them may be used independently, or two or more of them may be used in combination.

The compounding ratio of the second polyepoxide component and the second polyaddition type curing agent which are raw material components of the second cured epoxy resin used in the present invention, when the reactive groups of the second polyaddition type curing agent is a group which reacts with the epoxy groups by the ratio of 1:1, preferably a ratio which makes the equivalent ratio of the reactive groups of the second polyaddition type curing agent relative to the epoxy groups derived from the second polyepoxide component be 0.8 to 1.5 is preferred, 1.0 to 1.5 is more preferred. In the case where the second polyaddition type curing agent having the reactive groups which react with the epoxy groups by 1:1 is used, when the equivalent ratio of the reactive groups of the second polyaddition type curing agent relative to the epoxy groups derived from the second polyepoxide component is in the above range, it is possible to obtain the second cured epoxy resin having a lower water absorbing property as compared to the first cured epoxy resin, and having a dense three-dimensional network structure which cross links at crosslinking points which are many enough at room temperature, without increasing the reaction temperature to accelerate the polymerization reaction.

When the polyamine compound having active hydrogen as the second polyaddition type curing agent is used in the present invention, it is preferably used by a ratio which makes the equivalent ratio of amine active hydrogen relative to the epoxy groups derived from the second polyepoxide component be 0.5 to 1.5, more preferably used by a ratio which makes it be 1.0 to 1.5. Similarly to the above, when the equivalent ratio of amine active hydrogen relative to the epoxy groups is in the above range, it is possible to obtain the second cured epoxy resin having a lower water absorbing property as compared to the first cured epoxy resin, and having a dense three-dimensional network structure which cross links at crosslinking points which are many enough, without increasing the reaction temperature to accelerate the polymerization reaction. Note that the equivalent ratio of amine active hydrogen relative to the epoxy groups is preferably in the range similar to the above one also when it is calculated for the entire solid amount contained in the base layer forming composition. Further, the calculation method of the equivalent ratio of amine active hydrogen relative to the epoxy groups in this case can be performed similarly to the case of the water absorbing layer forming composition.

Further, when the mass fraction of the second polyaddition type curing agent relative to the second polyepoxide component becomes too many, there is a concern that properties of the obtained second cured epoxy resin become insufficient, and thus the ratio of the second polyaddition type curing agent relative to 100 mass % of the second polyepoxide component is preferably 60 mass % or less.

Note that when the second cured epoxy resin used in the present invention is obtained by a polyaddition reaction of the second polyepoxide component and the second polyaddition type curing agent, it is also possible to cause the polyaddition reaction under the existence of a second catalyst type curing agent as necessary. As the second catalyst type curing agent used as necessary for the second cured epoxy resin, a curing agent similar to the first catalyst type curing agent described for the first cured epoxy resin can be used. The compounding amount of the second catalyst type curing agent in the second cured epoxy resin can also be similar to the compounding amount of the first catalyst type curing agent in the first cured epoxy resin.

Hereinafter, the base layer forming composition used for forming the base layer whose main body is the second cured epoxy resin will be described. Note that in the following description, this base layer forming composition will be simply referred to as a "base layer forming composition".

(Base Layer Forming Composition)

The base layer forming composition normally contains a solvent besides the second polyepoxide component, the second polyaddition type curing agent, and the second catalyst type curing agent compounded as necessary. Further, as necessary, a reactive additive and a non-reactive additive other than these are contained. The second polyepoxide component, the second polyaddition type curing agent, and the second catalyst type curing agent compounded as necessary contained in the base layer forming composition are the same as described above, including the chemical compounds used and preferred modes, such as a ratio when combined.

Here, regarding the base layer forming composition, similarly to the above water absorbing layer forming composition, the second polyepoxide component and the second polyaddition type curing agent may be reacted in advance to a certain extent, under the existence of the second catalyst type curing agent compounded as necessary, in the composition before being applied to an application surface as a composition containing a solvent, and subsequently applied on the application surface, dried, and thereafter further reacted. Conditions when they are reacted in advance can be similar to the case of the above water absorbing layer forming composition.

The solvent used for the base layer forming composition is not particularly limited as long as it is a solvent having good solubility with respect to the compounded components including the second polyepoxide component, the second polyaddition type curing agent, the second catalyst type curing agent compounded as necessary, and other arbitrary components and is also a solvent inert to these compounded components, and specifically, solvents similar to those for the water absorbing layer forming composition are exemplified. Preferred modes of the solvent are also similar to those for the water absorbing layer forming composition.

Further, the amount of solvent in the base layer forming composition is preferably 200 to 950 mass %, more preferably 400 to 950 mass % relative to 100 mass % of the total mass of the entire solid amount in the second polyepoxide component, the second polyaddition type curing agent, the second catalyst type curing agent compounded as necessary, and other various compounded components which are compounded arbitrarily.

Here, the compounding ratio of the second polyepoxide component, the second polyaddition type curing agent, and the second catalyst type curing agent compounded as necessary in the base layer forming composition, regarding the second polyepoxide component is preferably 4 to 10 mass % relative to the total composition amount, and the total amount regarding the second polyaddition type curing agent and the second catalyst type curing agent compounded as necessary is preferably 0.1 to 5.0 mass % relative to the total composition amount.

As the reactive additives arbitrarily contained in the base layer forming composition, additives similar to the reactive additives arbitrarily contained in the water absorbing layer forming composition are exemplified. Among the reactive additives, the coupling agent is a component compounded in the base layer forming composition for the purpose of improving adhesiveness between the base layer and the substrate and adhesiveness between the base layer and the water absorbing layer, and is one of the components which are preferred to be contained.

The coupling agent compounded arbitrarily in the base layer forming composition is the same as the coupling agent used for the water absorbing layer forming composition, including the chemical compounds used and preferred modes. Further, regarding the amount of the coupling agent compounded in the base layer forming composition, the mass fraction of the coupling agent is preferably 5 to 50 mass %, more preferably 10 to 40 mass % relative to 100 mass % of the total mass of the second polyepoxide component, the second polyaddition type curing agent, and the second catalyst type curing agent compounded as necessary.

An upper limit of the compounding amount of the coupling agent is limited by the properties and function of the coupling agent. When it is used for the purpose of improving adhesiveness of the base layer whose main body is the second cured epoxy resin, the mass fraction of the coupling agent relative to the total mass of the second polyepoxide component, the second polyaddition type curing agent, and the second catalyst type curing agent compounded as necessary is preferably 50 mass % or less, more preferably 40 mass % or less.

On the other hand, when the properties such as water absorbing property of the base material whose main body is the second cured epoxy resin are adjusted with the coupling agent or the second polyaddition type curing agent and the coupling agent, the mass fraction of the coupling agent relative to 100 mass % of the total mass of the second polyepoxide component, the second polyaddition type curing agent, and the second catalyst type curing agent compounded as necessary is preferably 40 mass % or less, more preferably 20 mass % or less. By preventing the use amount of the coupling agent from becoming excessive, it is possible to prevent coloring of the base material whose main body is the second cured epoxy resin due to oxidation when exposed to high temperature, or the like.

Note that the compounding amount of the coupling agent relative to the total amount of the base layer forming composition is preferably 0.1 to 3.0 mass %, more preferably 0.5 to 2 mass % when, for example, the silane coupling agent is used. Here, to mention about a particularly preferred composition in the base layer forming composition containing the silane coupling agent, a composition is exemplified which contains the second polyepoxide component of 4 to 10 mass %, the polyamine compound having active hydrogen of 0.1 to 4.0 mass %, the silane coupling agent of 0.1 to 3.0 mass %, and the solvent of 70 to 95 mass % relative to the total amount of composition.

Further, when the base layer forming composition contains the coupling agent having an amino group having active hydrogen or the coupling agent having an epoxy group as the coupling agent, regarding an equivalent ratio of amine active hydrogen relative to the epoxy group or an equivalent ratio of active hydrogen contained in the reactive groups (other than the amino group having active hydrogen) contained in the second polyaddition type curing agent relative to the epoxy group, one calculated including these is preferably used to adjust the compounding amount of the respective components to be in the above range.

Preferably, the base layer forming composition further contains tetraalkoxysilane and/or oligomer thereof (that is, partially hydrolyzed condensate thereof) as an arbitrary component. By compounding the tetraalkoxysilane and/or oligomer thereof (hereinafter referred to as tetraalkoxysilane compound), viscosity of the base layer forming composition decreases, it becomes possible to evenly perform cross linking by a polyaddition reaction of the second polyepoxide component and the second polyaddition type curing agent which is performed under the existence of the second catalyst type curing agent compounded as necessary. Further, reaction points with the substrate and the water absorbing layer increase and adhesiveness improves further. Thus, weather resistance of the obtained base layer can be increased.

As the tetraalkoxysilane, tetramethoxysilane, tetraethoxysilane, tetra-n-propoxysilane, tetra-n-butoxysilane, and the like are exemplified. Among them, tetramethoxysilane and tetraethoxysilane are preferred. One of them may be used independently, or two or more of them may be used in combination. Moreover, the tetraalkoxysilane compound may be compounded in the base layer forming composition as oligomer obtained by partially hydrolyzed (co-)condensation of about two to three of tetraalkoxysilane, or may be compounded as a mixture of tetraalkoxysilane and oligomer thereof in the base layer forming composition.

The amount of tetraalkoxysilane and/or oligomer thereof compounded in the base layer forming composition is preferably 10 to 40 mass %, more preferably 10 to 30 mass % by oxide conversion relative to 100 mass % of the total mass of the second polyepoxide component, the second polyaddition type curing agent, and the second catalyst type curing agent compounded as necessary.

The base layer forming composition preferably contains, as a further arbitrarily component, an antioxidant for increasing weather resistance of the obtained base layer due to the same reason as the water absorbing layer forming composition.

The antioxidant compounded arbitrarily in the base layer forming composition can be the same as the antioxidant used for the water absorbing layer forming composition, including the chemical compounds used and preferred modes.

Further, the amount of the antioxidant compounded in the base layer forming composition is preferably 0.5 to 3 mass %, more preferably 0.5 to 1 mass % relative to 100 mass % of the total mass of the second polyepoxide component, the second polyaddition type curing agent, and the second catalyst type curing agent compounded as necessary.

Further, also to the base layer forming composition, as necessary, arbitrary components such as filler, ultraviolet absorbent, infrared absorbent, light stabilizer, leveling agent, defoamer, viscosity modifier, and/or the like similar to those contained in the water absorbing layer forming composition can be further added by similar amounts.

When the base layer is formed by using such a base layer forming composition, a base layer constituted of a base material with a saturated water absorption amount of 10 mg/cm$^3$ or less, whose main body is the second cured epoxy resin having a three-dimensional network structure, can be obtained, which is obtained by reacting the second polyepoxide component and the second polyaddition type curing agent contained in the composition under the existence of the second catalyst type curing agent compounded as necessary. Note that conditions of the above reaction will be explained in a manufacturing method, which will be described later.

Further, the arbitrarily added reactive additive such as the silane coupling agent exists under a base layer in the form of bonding to part of the three-dimensional network structure of this second cured epoxy resin, and moreover, non-reactive additives which are added arbitrarily besides them exist in the base layer in an evenly dispersed and contained state in the three-dimensional network structure of the second cured epoxy resin.

In the foregoing, the base layer provided arbitrarily between the substrate and the water absorbing layer in the present invention has been described with an example of the case where it is constituted of the base material whose main body is the second cured epoxy resin. However, the base layer just need to be a base layer constituted of a base material with a saturated water absorption amount of 10 mg/cm$^3$ or less, and is not limited thereto.

(Antifogging Film)

The antifogging film in the antifogging article of the present invention is formed on a surface of at least a part of the substrate. The surface on which the antifogging film is formed is selected appropriately according to its application. Normally, it is formed on one of main surfaces of the substrate. The antifogging film has the water absorbing layer formed on the substrate, and preferably has a structure in which the base layer and the water absorbing layer are layered sequentially from the substrate side. By having such a structure, the antifogging article of the present invention excels in appearance in addition to excellent antifogging property and durability such as abrasion resistance and moisture resistance.

Specifically presenting the water absorbing property of the antifogging film in the antifogging article of the present invention, the saturated water absorption amount measured by the method described for the water absorbing layer is 50 mg/cm$^3$ or more, preferably 70 mg/cm$^3$ or more, more preferably 100 mg/cm$^3$ or more.

Moreover, the water absorbing property of the antifogging film in the antifogging article of the present invention can be, as the water absorbing and antifogging property measured by the method described for the water absorbing layer, 50 seconds or more, 60 seconds or more in a further preferred embodiment, or 70 seconds or more in a particularly preferred embodiment. Here, the antifogging performance required for the antifogging article depends on its application, and thus the design of the antifogging film may be changed appropriately in line with the required performance. Note that a soda lime glass on which an antifogging process is not performed, normally fogs by about 1 to 3 seconds in the above test.

Further, the antifogging film in the antifogging article of the present invention may further have various functional films as necessary above or below the water absorbing layer formed on the substrate within a range that does not impair the effects of the present invention. As such a functional film, specifically, an antifouling layer giving contamination resistance to the antifogging film, ultraviolet shielding layer, infrared absorbing layer, and the like are exemplified.

<Method for Manufacturing the Antifogging Article>

The antifogging film of the antifogging article of the present invention has a structure having the water absorbing layer on the substrate and preferably a structure on which the base layer and the water absorbing layer are layered in order from the substrate side.

Such an antifogging film can be formed specifically by the following method of (1) or (2). Note that although the following method is a method for manufacturing the antifogging film having the base layer and the water absorbing layer, in the case of an antifogging film constituted only of a water absorbing layer, the water absorbing layer may be formed directly on the substrate similarly except that formation of the base layer in the following method is not performed.

(1) A method for obtaining an antifogging film by applying the base layer forming composition on a substrate surface and reacting it to form the base layer, and then applying the water absorbing layer forming composition on a base layer surface and reacting it to form the water absorbing layer.

(2) A method for obtaining an antifogging film, in which a base layer and a water absorbing layer are layered from the substrate surface side, by shaping, when the water absorbing layer forming composition is reacted to obtain the water absorbing material, the composition in a film form, that is, the form of the water absorbing layer, and forming a base layer as an adhesive layer between a substrate surface and this film (water absorbing layer) by using the base layer forming composition as an adhesive to join them.

Note that in the method of (2), it is also possible to form a film-formed water absorbing material (water absorbing layer) on a support having a release property, and release this from the support and bonded to the substrate surface by using the base layer forming composition as an adhesive. However, a method to bond the film-formed water absorbing material (water absorbing layer) together with this support on the substrate surface by using the base layer forming composition as an adhesive is preferred. The support to be used is not particularly limited as long as it does not impair the effects of the present invention, but a film or the like of acrylic resin such as polymethyl methacrylate is used preferably.

In the present invention, among these methods for forming the antifogging film, the method (1) is more preferred because it can maintain a good appearance when the base layer and the water absorbing layer are provided on the substrate surface having a large area or when industrial mass manufacturing is performed. Further, as the base layer forming composition, preferably, a base layer forming composition is used which contains the second polyepoxide component and the second polyaddition type curing agent for forming the base layer whose main body is the second cured epoxy resin. Hereinafter, a method for manufacturing the antifogging article of the present invention by the method (1) using such a base layer forming composition will be described.

The method for manufacturing the antifogging article of the present invention includes step (A); applying and reacting the base layer forming composition including the second polyepoxide component and the second polyaddition type curing agent on a substrate surface, so as to form the base layer constituted of the base material whose main body is the second cured epoxy resin, and step (B); applying and reacting on a surface of the base layer the water absorbing layer forming composition including the first polyepoxide component constituted only of at least two kinds of aliphatic polyepoxides with a molecular weight of 800 to 3000, the first polyaddition type curing agent, and the first catalyst type curing agent, so as to form the water absorbing layer constituted of the water absorbing material whose main body is the first cured epoxy resin.

The components contained in each of the base layer forming composition and the water absorbing layer forming composition are as described above, and the two kinds of compositions are obtained by mixing these components by an ordinary method.

In the step (A), the method to apply the base layer forming composition obtained above on the application surface of the substrate so as to form the base layer on the substrate is not particularly limited, and publicly known methods such as flow coating, dip coating, spin coating, spray coating, flexo printing, screen printing, gravure printing, roll coating, meniscus coating, die coating, wiping, and the like are exemplified. The application thickness of the base layer forming composition is a thickness which makes the thickness of the base layer finally obtained by reaction of the reaction components in the composition be in the above range.

After the base layer forming composition is applied on the substrate, the solvent is removed as necessary by drying, and a curing treatment is performed under conditions corresponding to the reaction components used, thereby making the base layer constituted of the base material whose main body is the second cured epoxy resin. As the conditions to remove the solvent by drying, specifically, 50 to 90° C. and 5 to 15 minutes are exemplified. Further, as a reaction condition of the reaction components in the base layer forming composition, namely, the second polyepoxide component and the second polyaddition type curing agent under existence of the second catalyst type curing agent compounded as necessary, specifically, a heat treatment at 70 to 150° C. for about 1 to 60 minutes is exemplified. Further, when the light-curing resin of UV curing is used, a process such as performing UV irradiation of 100 to 500 mJ/cm$^2$ for 1 to 5 seconds with a UV curing apparatus or the like is exemplified.

Here, in the manufacturing method of the present invention, preferably, the reaction of the base layer forming composition is performed under a constant humidifying condition. By performing the reaction under the humidifying condition, in a reaction performed under the same temperature condition, the reaction time can be shortened as compared to the case where humidifying is not performed. Further, when the reaction time is the same, by performing humidifying, it becomes possible to sufficiently carry out the reaction even when the reaction temperature is set low. In both cases, performing the reaction under the humidifying condition is economically advantageous. Moreover, by performing the reaction under the humidifying condition, the reaction can be performed evenly through the entire layer, and variance in quality in the base layer can be suppressed.

As the humidifying condition, specifically, 40 to 80% RH is exemplified, and a condition of 50 to 80% RH is more preferred. Presenting more preferred reaction conditions together with temperature conditions, reaction conditions of about 50 to 80% RH, 70 to 100° C., and 5 to 30 minutes are exemplified. As further preferred conditions, reaction conditions of about 50 to 80% RH, 80 to 100° C., and 10 to 30 minutes are exemplified.

On the surface of the base layer formed on the substrate by the step (A), the method of applying the water absorbing layer forming composition in the step (B) can be similar to the application method of the base layer forming composition. The application thickness of the water absorbing layer forming composition is a thickness which makes the thickness of the water absorbing layer finally obtained by reaction of the reaction components in the composition be in the above range.

After the water absorbing layer forming composition is applied on the base layer, the solvent is removed as necessary by drying, and a curing treatment is performed under conditions corresponding to the reaction components used, thereby making the water absorbing layer constituted of the water absorbing material whose main body is the first cured epoxy resin. As the conditions to remove the solvent by drying, specifically, 50 to 90° C. and 5 to 15 minutes are exemplified. Further, as a reaction condition of the reaction components in the water absorbing layer forming composition, namely, the first polyepoxide component and the first polyaddition type curing agent under existence of the first catalyst type curing agent, specifically, a heat treatment at 50 to 120° C. for about 10 to 60 minutes is exemplified. Further, when the light-curing resin of UV curing is used, a process such as performing UV irradiation of 50 to 1000 mJ/cm$^2$ for 5 to 10 seconds with a UV curing apparatus or the like is exemplified.

Here, in the manufacturing method of the present invention, the reaction of the water absorbing layer forming composition is preferably performed under a constant humidifying condition similarly to the case of the base layer forming composition due to the above reasons. As the humidifying condition, specifically, 40 to 80% RH is exemplified, and a condition of 50 to 80% RH is more preferred.

Presenting more preferred reaction conditions together with temperature conditions, reaction conditions of about 50 to 80% RH, 70 to 100° C., and 5 to 30 minutes are exemplified. As further preferred conditions, reaction conditions of about 50 to 80% RH, 80 to 100° C., and 10 to 30 minutes are exemplified.

By thus undergoing the step (A) and step (B), the antifogging article of the present invention in which the antifogging film is formed on the substrate is obtained.

<Article for Transportation Apparatus>

The antifogging article of the present invention is used preferably in an application as an article for transportation apparatus. As the article for transportation apparatus, preferably, a body, a window glass (windshield, side glass, rear glass), a mirror, and the like of train, automobile, ship, aircraft, or the like are exemplified.

The article for transportation apparatus having the antifogging article having the antifogging film of the present invention, since its antifogging film surface has an excellent antifogging property, adverse effects of fogging or the like induced by moisture can be eliminated. Further, the antifogging film also excels in durability, and thus this antifogging property can be maintained also, for example, in a long-term use under various use conditions including outdoor use as the article for transportation apparatus.

EXAMPLE

Hereinafter, the present invention will be described specifically by examples. The invention is not limited to these examples. Note that examples 1 to 12 and 15 to 31 are working examples and examples 13, 14, 32 and 33 are comparative examples. Example 34 is a reference example.

Abbreviations and properties of chemical compound used in the working examples and comparative examples are summarized below. Note that Denacol is a trade name by Nagese ChemteX Corporation.

(1) Polyepoxide
(1-1) Glycerol Polyglycidyl Ether
EX313: Denacol EX-313 (Mw: 383, epoxy equivalent: 141)
(1-2) Polyglycerol Polyglycidyl Ether
EX521: Denacol EX-521 (Mw: 1294, epoxy equivalent: 179)
(1-3) Aliphatic Polyglycidyl Ether
EX1410: Denacol EX-1410 (Mw: 988, epoxy equivalent: 160)
EX1610: Denacol EX-1610 (Mw: 1130, epoxy equivalent: 165)
(1-4) Bisphenol-A Diglycidyl Ether
jER828 (trade name, made by Mitsubishi Chemical Corporation, Mw: 340, epoxy equivalent: 190)
(1-5) Bisphenol-F Diglycidyl Ether
EP4901: ADEKA Resin EP4901 (trade name, made by ADEKA, Mw: 320, epoxy equivalent: 170)
(2) Polyaddition Type Curing Agent
T403: Jeffamine T-403 (trade name, made by Huntsman, Mw: 390, amine active hydrogen equivalent: 78), polyoxyalkylene triamine
QE340M: Polythiol QE-340M (trade name, made by Toray Fine Chemicals, thiol equivalent: 276), polyether polythiol
(3) Catalyst Type Curing Agent
2MZ: 2-methylimidazole
DMP30: 2,4,6-tris(dimethylaminomethyl) phenol
pTSAM: methyl p-toluenesulfonate (made by Tokyo Chemical Industry)

(4) Various Additives
KBM903 (trade name, made by Shin-Etsu Chemical): 3-aminopropyltrimethoxysilane
AO-50: ADK STAB AO-50 (trade name, made by ADEKA), phenolic antioxidant
NBACST: NBAC-ST (trade name, made by Nissan Chemical Industries), organo silica sol in which silica particles having a particle diameter of 10 to 20 nm are dispersed in butyl acetate, $SiO_2$ content is 30 mass %.
MEKST: MEK-ST (trade name, made by Nissan Chemical Industries), organo silica sol in which silica particles having a particle diameter of 10 to 20 nm are dispersed in methyl ethyl ketone, $SiO_2$ content is 30 mass %.
ITO sol: ITO sol prepared according to the following explanation was used.
ITO particles (12.0 g, primary particle diameter: 10 to 30 nm, made by Mitsubishi Material), dispersing agent (3.9 g, DISPERBYK-194, made by BYK-chemie), and solvent (24.2 g, Solmix AP-1, made by Japan Alcohol Trading) were put in a container, and disperse-processed for 48 hours by a ball mill, thereby obtaining an ITO sol whose ITO solid concentration is 30 mass %.
TV400: TINUVIN 400 (trade name, made by BASF), hydroxyphenyl triazine-based ultraviolet absorbent
LA72: ADK STAB LA-72 (trade name, made by ADEKA), hindered amine-based light stabilizer
MS51: M Silicate 51 (trade name, made by Tama Chemicals), methyl silicate Evaluation of the antifogging article in each example was performed as follows.

[Measurement of Film Thickness]

A cross-sectional image of the antifogging article was taken with a scanning electron microscope (made by Hitachi, S4300), and film thicknesses of respective layers of the base layer and the water absorbing layer were measured.

[Evaluation of Antifogging Property]

When the antifogging film has the base layer, measurement of the saturated water absorption amount of the base layer and the saturated water absorption amount of the antifogging film in which the water absorbing layer is formed on the base layer was performed by the above method (however, the size of the substrate depends on each example). When the antifogging film is constituted only of the water absorbing layer, measurement of only the saturated water absorption amount of the antifogging film was performed.

Moreover, the water absorbing and antifogging property of the antifogging film was measured by the above method. Antifogging performance required for the antifogging film differs depending on its application. In this example, in practice, water absorbing and antifogging property of 50 seconds or more is needed, 60 seconds or more is preferred, and 70 seconds or more is more preferred.

[Evaluation of Appearance]

Appearance of the antifogging film was evaluated based on evaluation criteria below.

○: No appearance defect can be seen, such as insufficiency of wet spreading of application liquid, unevenness of coating film, occurrence of wrinkle on coating film x: At least one appearance defect was seen among insufficiency of wet spreading of application liquid, unevenness of coating film, occurrence of wrinkle on coating film

[Evaluation of Moisture Resistance]

The antifogging film surface was held above a hot water bath of 40° C. for 35 minutes, thereafter air dried, and measurement of haze was performed immediately after it is dried. Changes of haze ($\Delta H(\%)$) before and after the exposure test were evaluated based on the following criteria. Moreover, the film surface was cleaned with ethanol, and thereafter the appearance was evaluated based on the following criteria.

(Haze Change ΔH (%))

⊚: ΔH was 1.5% or less.

○: ΔH was 2.5% or less.

x: at least either of ΔH being more than 2.5% or partial peeling of the antifogging film occurred.

(Appearance)

○: No significant change was seen on the appearance of the film.

x: Appearance change such as peeling, crack, whitening, unevenness, or perspective distortion of the film was seen.

[Evaluation of Abrasion Resistance]

It was performed in conformity with JIS R 3212 (vehicle interior side). The 5130 type abrasion resistance test apparatus by Taber and a wear wheel CS-10F was used. The wear wheel was brought into contact with the antifogging film surface of the antifogging article and was rotated 100 times while applying a load of 4.90 N, and a haze change ΔH (%) was measured and evaluated based on the following evaluation criteria.

○: ΔH was 5% or less.

x: at least either ΔH being more than 5% or partial peeling of the antifogging film occurred.

<1> Preparation of the Base Layer Forming Composition

Manufacturing Example A-1

In a glass container in which a stirrer and a thermometer were set, propylene glycol monomethyl ether (8.00 g, made by Daishin-Chemical), bisphenol-F diglycidyl ether (5.41 g, ADEKA Resin EP4901, made by ADEKA), polyoxyalkylene triamine (1.74 g, Jeffermine T403 (trade name), made by Huntsman), and amino silane (0.86 g, KBM903 (trade name), made by Shin-Etsu Chemical) were put and stirred at 25° C. for 30 minutes. Next, it was diluted five times by propylene glycol monomethyl ether (made by Daishin-Chemical), and leveling agent (0.04 g, BYK307 (trade name), made by BYK-chemie) was added, thereby obtaining a base layer forming composition (A-1). The composition and so on are presented in Table 1.

Manufacturing Example A-2

In a glass container in which a stirrer and a thermometer were set, propylene glycol monomethyl ether (8.00 g, made by Daishin-Chemical), bisphenol-F diglycidyl ether (5.38 g, ADEKA Resin EP4901, made by ADEKA), polyoxyalkylene triamine (1.73 g, Jeffermine T403 (trade name), made by Huntsman), amino silane (0.85 g, KBM903 (trade name), made by Shin-Etsu Chemical), and antioxidant (0.04 g, ADK STAB AO-50 (trade name), made by ADEKA) were put and stirred at 25° C. for 30 minutes. Next, it was diluted five times by propylene glycol monomethyl ether (made by Daishin-Chemical), and a leveling agent (0.04 g, BYK307 (trade name), made by BYK-chemie) was added, thereby obtaining a base layer forming composition (A-2). The composition and so on are presented in Table 1.

Manufacturing Example A-3

In a glass container in which a stirrer and a thermometer were set, propylene glycol monomethyl ether (8.00 g, made by Daishin-Chemical), bisphenol-F diglycidyl ether (5.38 g, ADEKA Resin EP4901, made by ADEKA), polyoxyalkylene triamine (1.73 g, Jeffermine T403 (trade name), made by Huntsman), amino silane (0.85 g, KBM903 (trade name), made by Shin-Etsu Chemical), and ultraviolet absorbent (0.04 g, TINUVIN 400 (trade name), made by BASF) were put and stirred at 25° C. for 30 minutes. Next, it was diluted five times by propylene glycol monomethyl ether (made by Daishin-Chemical), and a leveling agent (0.04 g, BYK307 (trade name), made by BYK-chemie) was added, thereby obtaining a base layer forming composition (A-3). The composition and so on are presented in Table 1.

Manufacturing Example A-4

In a glass container in which a stirrer and a thermometer were set, propylene glycol monomethyl ether (8.00 g, made by Daishin-Chemical), bisphenol-F diglycidyl ether (5.35 g, ADEKA Resin EP4901, made by ADEKA), polyoxyalkylene triamine (1.72 g, Jeffermine T403 (trade name), made by Huntsman), amino silane (0.85 g, KBM903 (trade name), made by Shin-Etsu Chemical), ultraviolet absorbent (0.04 g, TINUVIN 400 (trade name), made by BASF), and light stabilizer (0.04 g, ADK STAB LA-72 made by ADEKA) were put and stirred at 25° C. for 30 minutes. Next, it was diluted five times by propylene glycol monomethyl ether (made by Daishin-Chemical), and a leveling agent (0.04 g, BYK307 (trade name), made by BYK-chemie) was added, thereby obtaining a base layer forming composition (A-4). The composition and so on are presented in Table 1.

Manufacturing Example A-5

In a glass container in which a stirrer and a thermometer were set, propylene glycol monomethyl ether (7.24 g, made by Daishin-Chemical), bisphenol-F diglycidyl ether (4.79 g, ADEKA Resin EP4901, made by ADEKA), polyoxyalkylene triamine (1.54 g, Jeffermine T403 (trade name), made by Huntsman), amino silane (0.76 g, KBM903 (trade name), made by Shin-Etsu Chemical), methyl silicate (1.55 g, M Silicate 51 (trade name), made by Tama Chemicals), antioxidant (0.04 g, ADK STAB AO-50, made by ADEKA), ultraviolet absorbent (0.04 g, TINUVIN 400 (trade name), made by BASF), and light stabilizer (0.04 g, ADK STAB LA-72 made by ADEKA) were put and stirred at 25° C. for 30 minutes. Next, it was diluted five times by propylene glycol monomethyl ether (made by Daishin-Chemical), and a leveling agent (0.04 g, BYK307 (trade name), made by BYK-chemie) was added, thereby obtaining a base layer forming composition (A-5). The composition and so on are presented in Table 1.

Manufacturing Example A-6

In a glass container in which a stirrer and a thermometer were set, propylene glycol monomethyl ether (8.00 g, made by Daishin-Chemical), bisphenol-A diglycidyl ether (4.88 g, jER828, made by Mitsubishi Chemical Corporation), polyoxyalkylene triamine (2.01 g, Jeffermine T403 (trade name), made by Huntsman), amino silane (0.99 g, KBM903 (trade name), made by Shin-Etsu Chemical), antioxidant (0.04 g, ADK STAB AO-50, made by ADEKA), ultraviolet absorbent (0.04 g, TINUVIN 400 (trade name), made by BASF), and light stabilizer (0.04 g, ADK STAB LA-72 made by ADEKA) were put and stirred at 25° C. for 30 minutes. Next, it was diluted five times by propylene glycol monomethyl ether (made by Daishin-Chemical), and a leveling agent (0.04 g, BYK307 (trade name), made by BYK-chemie) was added, thereby obtaining a base layer forming composition (A-6). The composition and so on are presented in Table 1.

Manufacturing Example A-7

In a glass container in which a stirrer and a thermometer were set, propylene glycol monomethyl ether (8.00 g, made by Daishin-Chemical), bisphenol-F diglycidyl ether (3.44 g, ADEKA Resin EP4901, made by ADEKA), polythiol (3.90 g, Polythiol QE-340M (trade name), made by Toray Fine Chemicals), amino silane (0.54 g, KBM903 (trade name), made by Shin-Etsu Chemical), antioxidant (0.04 g, ADK STAB AO-50, made by ADEKA), ultraviolet absorbent (0.04 g, TINUVIN 400 (trade name), made by BASF), and light stabilizer (0.04 g, ADK STAB LA-72 made by ADEKA) were put and stirred at 25° C. for 30 minutes. Next, it was diluted five times by propylene glycol monomethyl ether (made by Daishin-Chemical), and a leveling agent (0.04 g, BYK307 (trade name), made by BYK-chemie) was added, thereby obtaining a base layer forming composition (A-7). The composition and so on are presented in Table 1.

Note that in the field of amine active hydrogen/epoxy groups in Table 1 for "A-7", the sum of the equivalent ratio of amine active hydrogen contained in amino silane and the epoxy groups (amine active hydrogen/epoxy groups) and the equivalent ratio of thiol groups contained in polythiol and the epoxy groups (thiol groups/epoxy groups) is presented. Here, the equivalent ratio of amine active hydrogen contained in amino silane and the epoxy groups (amine active hydrogen/epoxy groups) was 0.31. Thus, when a polyepoxide and a polyaddition type curing agent other than polyamine compound are taken as main components of the cured epoxy resin in the base layer forming composition, the equivalent ratio of amine active hydrogen/epoxy groups is preferably 0.5 or less.

alcohol=88:4:8 (mass ratio), 13.90 g, Neoethanol PIP (trade name), made by Daishin Chemical), aliphatic polyglycidyl ether (5.96 g, Denacol EX-1610 (made by Nagase ChemteX Corporation), polyglycerol polyglycidyl ether (13.90 g, Denacol EX-521, made by Nagase ChemteX Corporation), organo silica sol (0.91 g, NBAC-ST (trade name), mean primary particle diameter: 10 to 20 nm, made by Nissan Chemical Industries, $SiO_2$ content 30 mass %), 2-methyl imidazole (0.46 g, Shikoku Chemicals), amino silane (3.57 g, KBM 903 (trade name), made by Shin-Etsu Chemical), and polyoxyalkylene triamine (3.47 g, Jeffermine T403, made by Huntsman) were added while stirring, and stirred at 25° C. for one hour.

Next, organo silica sol (10.81 g, NBAC-ST (trade name), made by Nissan Chemical Industries), methyl ethyl ketone (32.44 g, made by Daishin Chemical), and leveling agent (0.04 g, BYK307 (trade name), made by BYK-chemie) were added while stirring, thereby obtaining a water absorbing layer forming composition (B-1). The composition and so on are presented in Table 2.

Example 2

Manufacturing of Water Absorbing Layer Forming Composition B-2

In a glass container in which a stirrer and a thermometer were set, mixed alcohol (ethanol:isopropyl alcohol:n-propyl alcohol=88:4:8 (mass ratio), 13.90 g, Neoethanol PIP (trade name), made by Daishin Chemical), aliphatic polyglycidyl ether (10.79 g, Denacol EX-1610 (made by Nagase ChemteX Corporation), polyglycerol polyglycidyl ether (8.96 g, Denacol EX-521, made by Nagase ChemteX Corporation), organo silica sol (0.91 g, NBAC-ST (trade name), mean primary particle diameter: 10 to 20 nm, made by Nissan

TABLE 1

| Base layer forming composition abbreviations | | | A-1 | A-2 | A-3 | A-4 | A-5 | A-6 | A-7 |
|---|---|---|---|---|---|---|---|---|---|
| Compounding amount (mass %) relative to total amount of composition Mass % relative to 100 mass % of (X') + (Y') | Second polyepoxide component (X') | EP4901 | 6.8% | 6.7% | 6.7% | 6.7% | 6.0% | — | 5.7% |
| | | jER828 | — | — | — | — | — | 6.1% | — |
| | Second polyaddition type curing agent (Y') | T403 | 2.2% | 2.2% | 2.2% | 2.1% | 1.9% | 2.5% | — |
| | | QE340M | — | — | — | — | — | — | 3.2% |
| | Silane coupling agent | KBM903 | 1.1% | 1.1% | 1.1% | 1.1% | 0.9% | 1.2% | 0.9% |
| | | | 12.0% | 12.0% | 12.0% | 12.0% | 12.0% | 14.4% | 10.1% |
| | Tetraalkoxysilane polymer (silica conversion) | MS51 | — | — | — | — | 12.4% | — | — |
| | Antioxidant | AO-50 | — | 0.6% | — | — | 0.6% | 0.6% | 0.6% |
| | Ultraviolet Absorbent | TV400 | — | — | 0.6% | 0.6% | 0.6% | 0.6% | 0.6% |
| | Light stabilize | LA72 | — | — | — | 0.6% | 0.6% | 0.6% | 0.6% |
| Amine active hydrogen/epoxy groups | | | 1.00 | 1.00 | 1.00 | 1.00 | 1.00 | 1.43 | 1.00 |

<2> Preparation of Water Absorbing Layer Forming Composition

Example 1

Manufacturing of Water Absorbing Layer Forming Composition B-1

In a glass container in which a stirrer and a thermometer were set, mixed alcohol (ethanol:isopropyl alcohol:n-propyl Chemical Industries, $SiO_2$ content 30 mass %), 2-methyl imidazole (0.46 g, Shikoku Chemicals), amino silane (3.63 g, KBM 903 (trade name), made by Shin-Etsu Chemical), and polyoxyalkylene triamine (3.52 g, Jeffermine T403, made by Huntsman) were added while stirring, and stirred at 25° C. for one hour.

Next, methyl ethyl ketone (32.44 g, made by Daishin Chemical), organo silica sol (0.39 g, NBAC-ST, made by Nissan Chemical Industries), and leveling agent (0.04 g, BYK307 (trade name), made by BYK-chemie) were added while stirring, thereby obtaining a water absorbing layer forming composition (B-2). The composition and so on are presented in Table 2.

Example 3

Manufacturing of Water Absorbing Layer Forming Composition B-3

In a glass container in which a stirrer and a thermometer were set, mixed alcohol (ethanol:isopropyl alcohol:n-propyl alcohol=88:4:8 (mass ratio), 13.90 g, Neoethanol PIP (trade name), made by Daishin Chemical), aliphatic polyglycidyl ether (13.78 g, Denacol EX-1610 (made by Nagase ChemteX Corporation), polyglycerol polyglycidyl ether (5.91 g, Denacol EX-521, made by Nagase ChemteX Corporation), organo silica sol (0.91 g, NBAC-ST (trade name), mean primary particle diameter: 10 to 20 nm, made by Nissan Chemical Industries, $SiO_2$ content 30 mass %), 2-methyl imidazole (0.46 g, Shikoku Chemicals), amino silane (3.66 g, KBM 903 (trade name), made by Shin-Etsu Chemical), and polyoxyalkylene triamine (3.55 g, Jeffermine T403, made by Huntsman) were added while stirring, and stirred at 25° C. for one hour.

Next, methyl ethyl ketone (32.44 g, made by Daishin Chemical), organo silica sol (0.39 g, NBAC-ST, made by Nissan Chemical Industries), and leveling agent (0.04 g, BYK307 (trade name), made by BYK-chemie) were added while stirring, thereby obtaining a water absorbing layer forming composition (B-3). The composition and so on are presented in Table 2.

Example 4

Manufacturing of Water Absorbing Layer Forming Composition B-4

In a glass container in which a stirrer and a thermometer were set, mixed alcohol (ethanol:isopropyl alcohol:n-propyl alcohol=88:4:8 (mass ratio), 13.90 g, Neoethanol PIP (trade name), made by Daishin Chemical), aliphatic polyglycidyl ether (8.21 g, Denacol EX-1610 (made by Nagase ChemteX Corporation), polyglycerol polyglycidyl ether (3.52 g, Denacol EX-521, made by Nagase ChemteX Corporation), organo silica sol (0.90 g, NBAC-ST (trade name), mean primary particle diameter: 10 to 20 nm, made by Nissan Chemical Industries, $SiO_2$ content 30 mass %), DMP30 (0.23 g, made by Tokyo Chemical Industries), amino silane (1.87 g, KBM 903 (trade name) made by Shin-Etsu Chemical), polythiol (13.40 g, Polythiol QE-340M, made by Toray Fine Chemicals), and antioxidant (0.14 g, ADK STAB AO-50, made by ADEKA) were added while stirring, and stirred at 25° C. for one hour.

Next, methyl ethyl ketone (32.44 g, made by Daishin Chemical), organo silica sol (0.39 g, NBAC-ST, made by Nissan Chemical Industries), and leveling agent (0.04 g, BYK307 (trade name), made by BYK-chemie) were added while stirring, thereby obtaining a water absorbing layer forming composition (B-4). The composition and so on are presented in Table 2.

Note that in the field of amine active hydrogen/epoxy groups in Table 2 for "B-4", the sum of the equivalent ratio of amine active hydrogen contained in amino silane and the epoxy groups (amine active hydrogen/epoxy groups) and the equivalent ratio of thiol group contained in polythiol and the epoxy groups (thiol group/epoxy groups) is presented.

Here, the equivalent ratio of amine active hydrogen contained in amino silane and the epoxy groups (amine active hydrogen/epoxy groups) was 0.31. Thus, when a polyepoxide and a polyaddition type curing agent other than polyamine compound are taken as main components of the cured epoxy resin in the water absorbing layer forming composition, the equivalent ratio of amine active hydrogen/epoxy groups is preferably 0.5 or less.

Example 5

Manufacturing of Water Absorbing Layer Forming Composition B-5

In a glass container in which a stirrer and a thermometer were set, mixed alcohol (ethanol:isopropyl alcohol:n-propyl alcohol=88:4:8 (mass ratio), 13.90 g, Neoethanol PIP (trade name), made by Daishin Chemical), aliphatic polyglycidyl ether (12.33 g, Denacol EX-1610 (made by Nagase ChemteX Corporation), polyglycerol polyglycidyl ether (5.28 g, Denacol EX-521, made by Nagase ChemteX Corporation), organo silica sol (0.90 g, NBAC-ST (trade name), mean primary particle diameter: 10 to 20 nm, made by Nissan Chemical Industries, $SiO_2$ content 30 mass %), pTSAM (3.16 g, methyl p-toluenesulfonate, made by Tokyo Chemical Industry), amino silane (3.27 g, KBM 903 (trade name) made by Shin-Etsu Chemical), polyoxyalkylene triamine (3.55 g, Jeffermine T403, made by Huntsman), and antioxidant (0.14 g, ADK STAB AO-50, made by ADEKA) were added while stirring, and stirred at 25° C. for one hour.

Next, methyl ethyl ketone (32.44 g, made by Daishin Chemical), organo silica sol (0.39 g, NBAC-ST, made by Nissan Chemical Industries), and leveling agent (0.04 g, BYK307 (trade name), made by BYK-chemie) were added while stirring, thereby obtaining a water absorbing layer forming composition (B-5). The composition and so on are presented in Table 2.

Example 6

Manufacturing of Water Absorbing Layer Forming Composition B-6

In a glass container in which a stirrer and a thermometer were set, mixed alcohol (ethanol:isopropyl alcohol:n-propyl alcohol=88:4:8 (mass ratio), 13.91 g, Neoethanol PIP (trade name), made by Daishin Chemical), aliphatic polyglycidyl ether (13.65 g, Denacol EX-1610 (made by Nagase ChemteX Corporation), polyglycerol polyglycidyl ether (5.85 g, Denacol EX-521, made by Nagase ChemteX Corporation), organo silica sol (0.90 g, NBAC-ST (trade name), mean primary particle diameter: 10 to 20 nm, made by Nissan Chemical Industries, $SiO_2$ content 30 mass %), 2-methyl imidazole (0.46 g, Shikoku Chemicals), amino silane (3.62 g, KBM 903 (trade name), made by Shin-Etsu Chemical), polyoxyalkylene triamine (3.52 g, Jeffermine T403, made by Huntsman), ultraviolet absorbent (0.14 g, TINUVIN 400, made by BASF), and light stabilizer (0.14 g, ADK STAB LA-72 made by ADEKA) were added while stirring, and stirred at 25° C. for one hour.

Next, methyl ethyl ketone (32.44 g, made by Daishin Chemical), organo silica sol (0.39 g, NBAC-ST, made by Nissan Chemical Industries), and leveling agent (0.04 g, BYK307 (trade name), made by BYK-chemie) were added while stirring, thereby obtaining a water absorbing layer forming composition (B-6). The composition and so on are presented in Table 2.

Example 7

Manufacturing of Water Absorbing Layer Forming Composition B-7

In a glass container in which a stirrer and a thermometer were set, mixed alcohol (ethanol:isopropyl alcohol:n-propyl alcohol=88:4:8 (mass ratio), 12.24 g, Neoethanol PIP (trade name), made by Daishin Chemical), aliphatic polyglycidyl ether (9.80 g, Denacol EX-1610 (made by Nagase ChemteX Corporation), polyglycerol polyglycidyl ether (8.14 g, Denacol EX-521, made by Nagase ChemteX Corporation), organo silica sol (6.44 g, MEK-ST (trade name), mean primary particle diameter: 10 to 20 nm, made by Nissan Chemical Industries, $SiO_2$ content 30 mass %), 2-methyl imidazole (0.42 g, Shikoku Chemicals), amino silane (3.29 g, KBM 903 (trade name), made by Shin-Etsu Chemical), polyoxyalkylene triamine (3.20 g, Jeffermine T403, made by Huntsman), and antioxidant (0.14 g, ADK STAB AO-50, made by ADEKA) were added while stirring, and stirred at 25° C. for one hour.

Next, methyl ethyl ketone (28.57 g, made by Daishin Chemical), organo silica sol (2.76 g, MEK-ST, made by Nissan Chemical Industries), and leveling agent (0.04 g, BYK307 (trade name), made by BYK-chemie) were added while stirring, thereby obtaining a water absorbing layer forming composition (B-7). The composition and so on are presented in Table 2.

Example 8

Manufacturing of Water Absorbing Layer Forming Composition B-8

In a glass container in which a stirrer and a thermometer were set, mixed alcohol (ethanol:isopropyl alcohol:n-propyl alcohol=88:4:8 (mass ratio), 12.23 g, Neoethanol PIP (trade name), made by Daishin Chemical), aliphatic polyglycidyl ether (9.85 g, Denacol EX-1610 (made by Nagase ChemteX Corporation), polyglycerol polyglycidyl ether (8.18 g, Denacol EX-521, made by Nagase ChemteX Corporation), ITO sol (6.48 g, mean primary particle diameter: 10 to 30 nm, ITO content 30 mass %), 2-methyl imidazole (0.42 g, Shikoku Chemicals), amino silane (3.31 g, KBM 903 (trade name), made by Shin-Etsu Chemical), and polyoxyalkylene triamine (3.21 g, Jeffermine T403, made by Huntsman) were added while stirring, and stirred at 25° C. for one hour.

Next, methyl ethyl ketone (28.54 g, made by Daishin Chemical), ITO sol (2.78 g), and leveling agent (0.04 g, BYK307 (trade name), made by BYK-chemie) were added while stirring, thereby obtaining a water absorbing layer forming composition (B-8). The composition and so on are presented in Table 2.

Example 9

Manufacturing of Water Absorbing Layer Forming Composition B-9

In a glass container in which a stirrer and a thermometer were set, mixed alcohol (ethanol:isopropyl alcohol:n-propyl alcohol=88:4:8 (mass ratio), 12.26 g, Neoethanol PIP (trade name), made by Daishin Chemical), aliphatic polyglycidyl ether (12.39 g, Denacol EX-1610 (made by Nagase ChemteX Corporation), polyglycerol polyglycidyl ether (5.31 g, Denacol EX-521, made by Nagase ChemteX Corporation), ITO sol (6.38 g, mean primary particle diameter: 10 to 30 nm, ITO content 30 mass %), 2-methyl imidazole (0.41 g, Shikoku Chemicals), amino silane (3.29 g, KBM 903 (trade name), made by Shin-Etsu Chemical), polyoxyalkylene triamine (3.20 g, Jeffermine T403, made by Huntsman), antioxidant (0.14 g, ADK STAB AO-50, made by ADEKA), ultraviolet absorbent (0.14 g, TINUVIN 400, made by BASF), and light stabilizer (0.14 g, ADK STAB LA-72 made by ADEKA) were added while stirring, and stirred at 25° C. for one hour.

Next, methyl ethyl ketone (28.61 g, made by Daishin Chemical), ITO sol (2.73 g), and leveling agent (0.04 g, BYK307 (trade name), made by BYK-chemie) were added while stirring, thereby obtaining a water absorbing layer forming composition (B-9). The composition and so on are presented in Table 2.

Example 10

Manufacturing of Water Absorbing Layer Forming Composition B-10

In a glass container in which a stirrer and a thermometer were set, mixed alcohol (ethanol:isopropyl alcohol:n-propyl alcohol=88:4:8 (mass ratio), 12.23 g, Neoethanol PIP (trade name), made by Daishin Chemical), aliphatic polyglycidyl ether (8.98 g, Denacol EX-1410 (made by Nagase ChemteX Corporation), polyglycerol polyglycidyl ether (8.98 g, Denacol EX-521, made by Nagase ChemteX Corporation), organo silica sol (6.48 g, MEK-ST (trade name), $SiO_2$ content 30 mass %), 2-methyl imidazole (0.42 g, Shikoku Chemicals), amino silane (3.34 g, KBM 903 (trade name), made by Shin-Etsu Chemical), and polyoxyalkylene triamine (3.24 g, Jeffermine T403, made by Huntsman) were added while stirring, and stirred at 25° C. for one hour.

Next, methyl ethyl ketone (28.54 g, made by Daishin Chemical), organo silica sol (2.78 g), and leveling agent (0.04 g, BYK307 (trade name), made by BYK-chemie) were added while stirring, thereby obtaining a water absorbing layer forming composition (B-10). The composition and so on are presented in Table 2.

Example 11

Manufacturing of Water Absorbing Layer Forming Composition B-11

In a glass container in which a stirrer and a thermometer were set, mixed alcohol (ethanol:isopropyl alcohol:n-propyl alcohol=88:4:8 (mass ratio), 13.21 g, Neoethanol PIP (trade name), made by Daishin Chemical), aliphatic polyglycidyl ether (10.34 g, Denacol EX-1610 (made by Nagase ChemteX Corporation), polyglycerol polyglycidyl ether (8.59 g, Denacol EX-521, made by Nagase ChemteX Corporation), organo silica sol (3.22 g, MEK-ST (trade name), $SiO_2$ content 30 mass %), 2-methyl imidazole (0.44 g, Shikoku Chemicals), amino silane (3.48 g, KBM 903 (trade name), made by Shin-Etsu Chemical), polyoxyalkylene triamine (3.38 g, Jeffermine T403, made by Huntsman), and antioxidant (0.14 g, ADK STAB AO-50, made by ADEKA) were added while stirring, and stirred at 25° C. for one hour.

Next, methyl ethyl ketone (30.82 g, made by Daishin Chemical), organo silica sol (1.38 g, MEK-ST (trade name), $SiO_2$ content 30 mass %), and leveling agent (0.04 g, BYK307 (trade name), made by BYK-chemie) were added while stirring, thereby obtaining a water absorbing layer forming composition (B-11). The composition and so on are presented in Table 2.

Example 12

Manufacturing of Water Absorbing Layer Forming Composition B-12

In a glass container in which a stirrer and a thermometer were set, mixed alcohol (ethanol:isopropyl alcohol:n-propyl alcohol=88:4:8 (mass ratio), 11.28 g, Neoethanol PIP (trade name), made by Daishin Chemical), aliphatic polyglycidyl ether (9.25 g, Denacol EX-1610 (made by Nagase ChemteX Corporation), polyglycerol polyglycidyl ether (7.69 g, Denacol EX-521, made by Nagase ChemteX Corporation), organo silica sol (9.66 g, MEK-ST (trade name), $SiO_2$ content 30 mass %), 2-methyl imidazole (0.40 g, Shikoku Chemicals), amino silane (3.11 g, KBM 903 (trade name), made by Shin-Etsu Chemical), polyoxyalkylene triamine (3.02 g, Jeffermine T403, made by Huntsman), and antioxidant (0.14 g, ADK STAB AO-50, made by ADEKA) were added while stirring, and stirred at 25° C. for one hour.

Next, methyl ethyl ketone (26.31 g, made by Daishin Chemical), organo silica sol (4.14 g, MEK-ST (trade name), $SiO_2$ content 30 mass %), and leveling agent (0.04 g, BYK307 (trade name), made by BYK-chemie) were added while stirring, thereby obtaining a water absorbing layer forming composition (B-12). The composition and so on are presented in Table 2.

Example 13

Manufacturing of Water Absorbing Layer Forming Composition B-13

In a glass container in which a stirrer and a thermometer were set, mixed alcohol (ethanol:isopropyl alcohol:n-propyl alcohol=88:4:8 (mass ratio), 13.90 g, Neoethanol PIP (trade name), made by Daishin Chemical), aliphatic polyglycidyl ether (9.52 g, Denacol EX-1610 (made by Nagase ChemteX Corporation), glycerol polyglycidyl ether (9.52 g, Denacol EX-313, made by Nagase ChemteX Corporation), organo silica sol (0.90 g, NBAC-ST (trade name), $SiO_2$ content 30 mass %), 2-methyl imidazole (0.45 g, Shikoku Chemicals), amino silane (3.93 g, KBM 903 (trade name), made by Shin-Etsu Chemical), polyoxyalkylene triamine (3.81 g, Jeffermine T403, made by Huntsman), and antioxidant (0.14 g, ADK STAB AO-50, made by ADEKA) were added while stirring, and stirred at 25° C. for one hour.

Next, methyl ethyl ketone (32.44 g, made by Daishin Chemical), organo silica sol (0.39 g, NBAC-ST (trade name), $SiO_2$ content 30 mass %), and leveling agent (0.04 g, BYK307 (trade name), made by BYK-chemie) were added while stirring, thereby obtaining a water absorbing layer forming composition (B-13). The composition and so on are presented in Table 3.

Example 14

Manufacturing of Water Absorbing Layer Forming Composition B-14

In a glass container in which a stirrer and a thermometer were set, mixed alcohol (ethanol:isopropyl alcohol:n-propyl alcohol=88:4:8 (mass ratio), 13.90 g, Neoethanol PIP (trade name), made by Daishin Chemical), aliphatic polyglycidyl ether (19.47 g, Denacol EX-1610 (made by Nagase ChemteX Corporation), organo silica sol (0.90 g, NBAC-ST (trade name), $SiO_2$ content 30 mass %), 2-methyl imidazole (0.46 g, Shikoku Chemicals), amino silane (3.70 g, KBM 903 (trade name), made by Shin-Etsu Chemical), polyoxyalkylene triamine (3.60 g, Jeffermine T403, made by Huntsman), and antioxidant (0.14 g, ADK STAB AO-50, made by ADEKA) were added while stirring, and stirred at 25° C. for one hour.

Next, methyl ethyl ketone (32.44 g, made by Daishin Chemical), organo silica sol (0.39 g, NBAC-ST (trade name), $SiO_2$ content 30 mass %), and leveling agent (0.04 g, BYK307 (trade name), made by BYK-chemie) were added while stirring, thereby obtaining a water absorbing layer forming composition (B-14). The composition and so on are presented in Table 3.

TABLE 2

| Water absorbing layer forming composition abbreviations | | | Example 1 B-1 | Example 2 B-2 | Example 3 B-3 | Example 4 B-4 | Example 5 B-5 | Example 6 B-6 |
|---|---|---|---|---|---|---|---|---|
| Ratio in (X) (mass %) | First polyepoxide component (X) | EX521 | 70% | 45% | 30% | 30% | 30% | 30% |
| | | EX1610 | 30% | 55% | 70% | 70% | 70% | 70% |
| | | EX1410 | — | — | — | — | — | — |
| | | EX313 (Low molecular weight) | — | — | — | — | — | — |
| Compounding amount (mass %) relative to total composition amount | | Total compounding amount | 23.2% | 26.3% | 26.3% | 15.6% | 23.4% | 26.0% |
| | First polyaddition type curing agent (Y) | T403 | 4.1% | 4.7% | 4.7% | — | 4.7% | 4.7% |
| | | QE340M | — | — | — | 17.9% | — | — |
| Mass % relative to 100 mass % of (X) | First catalyst type curing agent (Z) | 2MZ | 2.3% | 2.3% | 2.3% | — | — | 2.4% |
| | | DMP30 | — | — | — | 2.0% | — | — |
| | | pTSAM | — | — | — | — | 17.9% | — |
| amount (mass %) relative to total composition amount | Silane coupling agent | KBM903 | 4.2% | 4.8% | 4.9% | 2.5% | 4.3% | 4.8% |

TABLE 2-continued

| Mass % relative to 100 mass % of (X) + (Y) + (Z) | Filler (oxide conversion) | NBACST | 15.0% 14.8% | 15.3% 1.6% | 15.4% 1.6% | 7.4% 1.5% | 13.4% 1.6% | 15.4% 1.6% |
|---|---|---|---|---|---|---|---|---|
| | | MEKST | — | — | — | — | — | — |
| | Infrared absorbent | ITO sol (oxide conversion) | — | — | — | — | — | — |
| | Antioxidant | AO-50 | — | — | — | 0.6% | 0.6% | — |
| | Ultraviolet absorbent | TV400 | — | — | — | — | — | 0.6% |
| | Light stabilizer | LA72 | — | — | — | — | — | 0.6% |
| Amine active hydrogen/epoxy groups | | | 0.74 | 0.74 | 0.74 | 1.00 | 0.74 | 0.74 |

| | | | Example |||||| 
|---|---|---|---|---|---|---|---|---|
| | | | 7 | 8 | 9 | 10 | 11 | 12 |
| Water absorbing layer forming composition abbreviations | | | B-7 | B-8 | B-9 | B-10 | B-11 | B-12 |
| Ratio in (X) (mass %) | First polyepoxide component (X) | EX521 | 45% | 45% | 30% | 50% | 45% | 45% |
| | | EX1610 | 55% | 55% | 70% | — | 55% | 55% |
| | | EX1410 | — | — | — | 50% | — | — |
| | | EX313 (Low molecular weight) | — | — | — | — | — | — |
| Compounding amount (mass %) relative to total composition amount | | Total compounding amount | 23.9% | 24.0% | 23.6% | 23.9% | 25.2% | 22.6% |
| | First polyaddition type curing agent (Y) | T403 | 4.3% | 4.3% | 4.3% | 4.3% | 4.5% | 4.0% |
| | | QE340M | — | — | — | — | — | — |
| Mass % relative to 100 mass % of (X) | First catalyst type curing agent (Z) | 2MZ | 2.3% | 2.3% | 2.3% | 2.3% | 2.3% | 2.4% |
| | | DMP30 | — | — | — | — | — | — |
| | | pTSAM | — | — | — | — | — | — |
| amount (mass %) relative to total composition amount | Silane coupling agent | KBM903 | 4.4% | 4.4% | 4.4% | 4.5% | 4.6% | 4.1% |
| Mass % relative to 100 mass % of (X) + (Y) + (Z) | Filler (oxide conversion) | NBACST | 15.3% | 15.3% | 15.4% | 15.4% | 15.3% | 15.3% |
| | | MEKST | — | — | — | — | — | — |
| | Infrared absorbent | ITO sol (oxide conversion) | 12.8% | — | — | 12.8% | 6.1% | 20.3% |
| | | | — | 12.8% | 12.8% | — | — | — |
| | Antioxidant | AO-50 | 0.6% | — | 0.7% | — | 0.6% | 0.7% |
| | Ultraviolet absorbent | TV400 | — | — | 0.7% | — | — | — |
| | Light stabilizer | LA72 | — | — | 0.7% | — | — | — |
| Amine active hydrogen/epoxy groups | | | 0.74 | 0.74 | 0.74 | 0.74 | 0.74 | 0.74 |

TABLE 3

| | | | Example ||
|---|---|---|---|---|
| | | | 13 | 14 |
| Water absorbing layer forming composition abbreviations | | | B-13 | B-14 |
| Ratio in (X) (mass %) | First polyepoxide component (X) | EX521 | — | — |
| | | EX1610 | 50% | 100% |
| | | EX1410 | — | — |
| | | EX313 (Low molecular weight) | 50% | — |
| Compounding amount (mass %) relative to total composition amount | First polyaddition type curing agent (Y) | Total compounding amount | 25.4% | 26.0% |
| | | T403 | 5.1% | 4.8% |
| | | QE340M | — | — |
| Mass % relative to 100 mass % of (X) | First catalyst type curing agent (Z) | 2MZ | 2.4% | 2.4% |
| | | DMP30 | — | — |
| | | pTSAM | — | — |

TABLE 3-continued

|  |  |  | Example | |
|---|---|---|---|---|
|  |  |  | 13 | 14 |
| Compounding amount (mass %) relative to total composition amount | Silane coupling agent | KBM903 | 5.2% | 4.9% |
| Mass % relative to 100 mass % of (X) + (Y) + (Z) |  |  | 16.9% | 15.7% |
|  | Filler (oxide conversion) | NBACST | 1.7% | 1.6% |
|  |  | MEKST | — | — |
|  | Infrared absorbent | ITO sol (oxide conversion) | — | — |
|  | Antioxidant | AO-50 | 0.6% | 0.6% |
|  | Ultraviolet absorbent | TV400 | — | — |
|  | Light stabilizer | LA72 | — | — |
| Amine active hydrogen/epoxy groups |  |  | 0.74 | 0.75 |

<3> Manufacturing and Evaluation of Antifogging Article

By using the respective compositions obtained in the above manufacturing example, the antifogging film was formed on each of the substrates as follows and evaluation was performed by the above evaluation method. The obtained result is presented in Table 4.

Example 15

A dried clean soda lime glass plate (water contact angle 3°, 200 mm×200 mm×2 mm thickness) whose surface was polished and cleaned with cerium oxide was used as the substrate, the water absorbing layer forming composition B-1 obtained in example 1 was applied by flow coating on the surface of the glass plate, and it was retained for 30 minutes in an electric furnace at 100° C. to form a water absorbing layer, thereby obtaining an antifogging article having an antifogging film.

Example 16 to Example 29, Examples 32, 33

A dried clean soda lime glass plate (water contact angle 3°, 200 mm×200 mm×2 mm thickness) whose surface was polished and cleaned with cerium oxide was used as the substrate, one of the base layer forming composition A-1 to A-7 obtained in the manufacturing example A was applied as presented in Table 4 by flow coating on the surface of the glass plate, and it was retained for 30 minutes in the electric furnace at 100° C. to form a base layer. Next, on the formed base layer surface, one of the water absorbing layer forming compositions B-1 to B-14 obtained in examples 1 to 14 as illustrated in Table 4 was applied by flow coating, and it was retained for 30 minutes in the electric furnace at 100° C. to form a water absorbing layer, thereby obtaining an antifogging article having an antifogging film constituted of two layers.

Example 30

A clean polycarbonate plate (water contact angle 16°, 200 mm×200 mm×2 mm thickness, Panlite PC-1151, made by TEIJIN) from which surface contaminants were removed with acetone and on which a UV ozone gas treatment was performed was used as the substrate, the base layer forming composition A-1 obtained in the manufacturing example A-1 was applied by flow coating on the surface of the polycarbonate plate, and it was retained for 30 minutes in the electric furnace at 100° C. to form a base layer. Next, on the formed base layer surface, the water absorbing layer forming composition B-1 obtained in the example 1 was applied by flow coating, and it was retained for 30 minutes in the electric furnace at 100° C. to form a water absorbing layer, thereby obtaining an antifogging article having an antifogging film constituted of two layers.

Example 31

A dried clean laminated glass plates for windshield of automobile (water contact angle 5°) whose surface was polished and cleaned with cerium oxide was used as the substrate, the base layer forming composition A-6 obtained in the manufacturing example A-6 was applied by flow coating on the surface of the glass plate, and it was retained for 30 minutes in the electric furnace at 100° C. to form a base layer. Next, on the formed base layer surface, the water absorbing layer forming composition B-7 obtained in the example 7 was applied by flow coating, and it was retained for 30 minutes in the electric furnace at 100° C. to form a water absorbing layer, and obtaining an article for transportation apparatus made in a module that can be attached to a front region of an automobile and having an antifogging film constituted of two layers.

Example 34

The substrate with the antifogging film obtained in example 32 was immersed in a hot water at 50° C. for five minutes, thereby obtaining an antifogging article.

TABLE 4

| EXAMPLE | Substrate | Base layer | | | Water absorbing layer | | | Antifogging film | | | Appearance | ΔH | Moisture resistance Appearance | Abrasion resistance |
|---|---|---|---|---|---|---|---|---|---|---|---|---|---|---|
| | | Composition abbreviation | Film thickness [μm] | Saturated water absorption amount [mgH₂O/cm³] | Composition abbreviation | Film thickness [μm] | Hot water immersion | Film thickness [μm] | Saturated water absorption amount [mgH₂O/cm³] | Water absorbing and antifogging property | | | | |
| 15 | Single plate glass | — | — | — | B-1 | 26.5 | — | 26.5 | 230 | 130 | ○ | ○ | ○ | ○ |
| 16 | Single plate glass | A-1 | 5.0 | 4.2 | B-1 | 23.4 | — | 28.4 | 253 | 130 | ○ | ○ | ○ | ○ |
| 17 | Single plate glass | A-2 | 3.4 | 5.0 | B-2 | 19.0 | — | 22.4 | 190 | 110 | ○ | ○ | ○ | ○ |
| 18 | Single plate glass | A-3 | 4.5 | 5.9 | B-3 | 22.3 | — | 26.8 | 170 | 105 | ○ | ○ | ○ | ○ |
| 19 | Single plate glass | A-4 | 4.0 | 6.2 | B-4 | 22.0 | — | 26 | 352 | 230 | ○ | ○ | ○ | ○ |
| 20 | Single plate glass | A-5 | 3.0 | 7.1 | B-5 | 19.0 | — | 22 | 331 | 192 | ○ | ○ | ○ | ○ |
| 21 | Single plate glass | A-5 | 5.6 | 5.6 | B-6 | 22.5 | — | 28.1 | 176 | 95 | ○ | ○ | ○ | ○ |
| 22 | Single plate glass | A-5 | 3.5 | 6.4 | B-7 | 20.9 | — | 24.4 | 152 | 75 | ○ | ◎ | ○ | ○ |
| 23 | Single plate glass | A-5 | 4.0 | 7.5 | B-8 | 21.3 | — | 25.3 | 140 | 80 | ○ | ○ | ○ | ○ |
| 24 | Single plate glass | A-5 | 5.1 | 5.6 | B-9 | 22.6 | — | 27.7 | 134 | 82 | ○ | ○ | ○ | ○ |
| 25 | Single plate glass | A-5 | 4.5 | 5.6 | B-10 | 18.6 | — | 23.1 | 120 | 62 | ○ | ◎ | ○ | ○ |
| 26 | Single plate glass | A-6 | 4.2 | 6.5 | B-7 | 19.3 | — | 23.5 | 156 | 82 | ○ | ◎ | ○ | ○ |
| 27 | Single plate glass | A-7 | 3.1 | 9.1 | B-10 | 17.0 | — | 20.1 | 101 | 60 | ○ | ◎ | ○ | ○ |
| 28 | Single plate glass | A-6 | 4.2 | 6.5 | B-11 | 18.5 | — | 22.7 | 183 | 98 | ○ | ◎ | ○ | ○ |
| 29 | Single plate glass | A-6 | 4.2 | 6.5 | B-12 | 18.2 | — | 22.4 | 152 | 87 | ○ | ◎ | ○ | ○ |
| 30 | PC | A-1 | 4.9 | 4.7 | B-1 | 25.6 | — | 30.5 | 224 | 126 | ○ | ○ | ○ | ○ |
| 31 | Laminated glass plates | A-6 | 4.1 | 5.9 | B-7 | 19.4 | — | 23.5 | 176 | 103 | ○ | ◎ | ○ | ○ |
| 32 | Single plate glass | A-1 | 3.7 | 4.5 | B-13 | 24.1 | — | 27.8 | 282 | 156 | ○ | X | X | ○ |
| 33 | Single plate glass | A-2 | 5.2 | 5.4 | B-14 | 26.1 | — | 31.3 | 261 | 128 | X | ◎ | ○ | ○ |
| 34 | Single plate glass | A-1 | 3.7 | 4.5 | B-13 | 24.1 | 50 deg 5 min | 27.8 | 280 | 242 | ○ | ◎ | ○ | ○ |

From evaluation results presented in Table 4, it can be seen that the antifogging articles obtained in examples 15 to 30 which are working examples and the laminated glass plates for windshield of automobile (article for transportation apparatus) of example 31 have an excellent antifogging property and appearance, moisture resistance, and abrasion resistance, whereas the antifogging articles obtained in examples 32, 33 which are comparative examples are insufficient in either appearance or moisture resistance. In example 34 which is a reference example, moisture resistance is improved by adding a hot water immersion treatment to example 32 as a comparative example, but it increases the number of steps leading to increase in manufacturing costs, and hence is not preferred. Note that the evaluation of water absorbing properties such as the saturated water absorption amount and the water absorbing and antifogging property was performed on the base layer surface in the stage of forming the base layer, and was performed on the antifogging film surface, namely, the surface of the water absorbing layer, where the water absorbing layer is laminated on the base layer, in the stage that the water absorbing layer is further formed on the surface of the base layer to make an antifogging article. Here, evaluation results of water absorbing properties of only water absorbing layers are not obtained except example 15, but the film thickness of the water absorbing layer in each example is thicker by at least 2.5 times or more as compared to the film thickness of the base layer, where it is conceivable that it is only a water absorbing rate of the water absorbing layer that dominates the water absorbing property. Thus, the water absorbing property on the antifogging film surface and the water absorbing property of the water absorbing layer may be regarded as almost equal.

The antifogging article of the present invention excels in antifogging property and also excels in durability, such as abrasion resistance and moisture resistance, and appearance, therefore it can be used effectively in an application as an article for transportation apparatus.

What is claimed is:

1. An antifogging article having a substrate and an antifogging film on a surface of at least a part of the substrate, wherein:

the antifogging film has (i) a water absorbing layer formed on the substrate surface and comprises a water absorbing material with a saturated water absorption amount of 50 mg/cm$^3$ or more and (ii) a base layer comprising a base material with a saturated water absorption amount of 10 mg/cm$^3$ or less between the substrate and the water absorbing layer;

the water absorbing material is a material comprising a first cured epoxy resin as a main body, obtained by reacting a water absorbing layer forming composition comprising a first polyepoxide component, a first polyaddition curing agent, a catalyst curing agent;

the first polyepoxide component contained in the water absorbing layer forming composition is constituted only of at least two polyepoxides selected from aliphatic polyepoxides with mass average molecular weights of 800 to 3000; the water absorbing layer forming composition further comprises a silane coupling agent; a content of the silane coupling agent is 5 to 40 mass % relative to 100 mass % of the total mass of the first polyepoxide component, the first polyaddition curing agent, and the catalyst curing agent and the base material is a material whose main body is a second cured epoxy resin obtained by reacting a base layer forming composition comprising a second polyepoxide component and a second polyaddition curing agent.

2. The antifogging article according to claim 1, wherein the water absorbing layer forming composition further comprises a filler.

3. The antifogging article according to claim 2, wherein a content of the filler is 0.5 to 30 mass % relative to 100 mass % of the total mass of the first polyepoxide component, the first polyaddition curing agent, and the catalyst curing agent.

4. The antifogging article according to claim 2, wherein the filler is silica particles.

5. The antifogging article according to claim 1, wherein the first polyaddition curing agent comprises a polyamine compound having active hydrogen.

6. The antifogging article according to claim 5, wherein an equivalent ratio of amine active hydrogen relative to epoxy groups included in an entire solid amount contained in the water absorbing layer forming composition is 0.6 to 0.8.

7. The antifogging article according to claim 1, wherein a content of the catalyst curing agent is 1.0 to 20 mass % relative to 100 mass % of the first polyepoxide component.

8. The antifogging article according to claim 1, wherein the catalyst curing agent comprises an imidazole compound.

9. The antifogging article according to claim 1, wherein a film thickness of the water absorbing layer is 5 to 40 µm.

10. The antifogging article according to claim 1, wherein a film thickness of the base layer is 2 to 8µm.

11. The antifogging article according to claim 1, wherein the substrate comprises soda lime glass.

12. An article for transportation apparatus, comprising the antifogging article according to claim 1.

13. A method for manufacturing the antifogging article according to claim 1, the method comprising:

applying and reacting the base layer forming composition on the substrate surface, so as to form the base layer comprising the base material; and applying and reacting on a surface of the base layer the water absorbing layer forming composition, so as to form the water absorbing layer comprising the water absorbing material.

14. The antifogging article according to claim 1, wherein the silane coupling agent has an amino group.

15. The antifogging article according to claim 1, wherein the first polyaddition curing agent is a polyoxyalkylene polyamine, wherein an equivalent ratio of amine active hydrogen of the polyoxyalkylene polyamine to the epoxy groups derived from the first polyepoxide component is 0.6 to 0.8.

* * * * *